United States Patent [19]

Kushida et al.

[11] Patent Number: 5,564,157

[45] Date of Patent: Oct. 15, 1996

[54] VEHICLE WINDSHIELD WIPER BLADE ASSEMBLY AND WIPER SYSTEM

[75] Inventors: Tadao Kushida, Odawara; Shuji Moro, Hiratsuka; Takashi Kuzuno, Kanagawa; Yoshitaka Kaneko, Yokohama; Yuji Yagi, Atsugi; Chihiro Ueki, Hiratsuka; Akira Kadokura, Hadano, all of Japan

[73] Assignee: Ichikoh Industries, Ltd., Tokyo, Japan

[21] Appl. No.: 212,144

[22] Filed: Mar. 14, 1994

[30]    Foreign Application Priority Data

| Mar. 12, 1993 | [JP] | Japan | 5-051877 |
| Aug. 24, 1993 | [JP] | Japan | 5-046106 U |
| Aug. 24, 1993 | [JP] | Japan | 5-046107 U |
| Nov. 11, 1993 | [JP] | Japan | 5-282794 |

[51] Int. Cl.$^6$ ............................ B60S 1/04; B60S 1/38
[52] U.S. Cl. ..................... 15/250.201; 15/250.46; 15/250.44; 15/250.351
[58] Field of Search ............ 15/250.43, 250.44, 15/250.451, 250.452, 250.453, 250.454, 250.46, 250.47, 250.48, 250.31, 250.05, 250.001, 250.201, 250.202, 250.361, 250.351

[56]    References Cited

U.S. PATENT DOCUMENTS

| 2,727,271 | 12/1955 | Oishei et al. | 15/250.44 |
| 2,799,887 | 7/1957 | Nemic | 15/250.201 |
| 3,619,556 | 11/1971 | Deibel | 15/250.44 |
| 4,360,941 | 11/1982 | Mabie | 15/250.44 |
| 4,418,441 | 12/1983 | von den Berg | 15/250.46 |
| 5,283,925 | 2/1994 | Maubray | 15/250.201 |

FOREIGN PATENT DOCUMENTS

| 962813 | 2/1975 | Canada | 15/250.44 |
| 2556297 | 6/1985 | France | 15/250.201 |
| 2679186 | 1/1993 | France | 15/250.201 |
| 45251 | 3/1984 | Japan | 15/250.44 |
| 459302 | 12/1991 | Japan | 15/250.201 |
| 2144976 | 3/1985 | United Kingdom | 15/250.44 |

*Primary Examiner*—Gary K. Graham
*Attorney, Agent, or Firm*—Foley & Lardner

[57]    ABSTRACT

A vehicle wiper blade assembly has a cover for covering blade support members, which support a wiper blade at different points therealong, and for covering portions of the wiper blade. A blade spoiler can be adjustably attached either to a primary lever, which connects the support members with the cover to a wiper arm, or to the wiper arm. The spoiler presses the wiper blade against the windshield when the vehicle is moving, improving the wiping efficiency. The lower edge of the spoiler is positioned nearer to the windshield than to the to the bottom of the cover to improve air and debris (such as snow) flow. The support members are also pivotally coupled to both ends of the primary lever to improve the wiper blade efficiency.

8 Claims, 35 Drawing Sheets

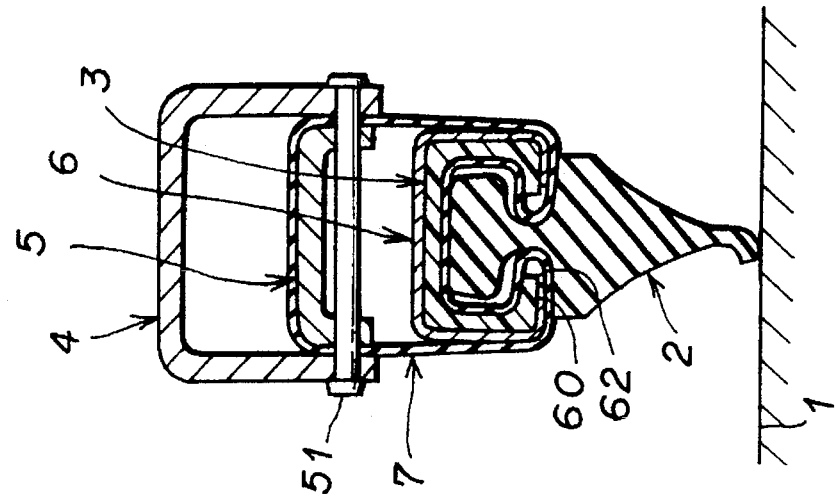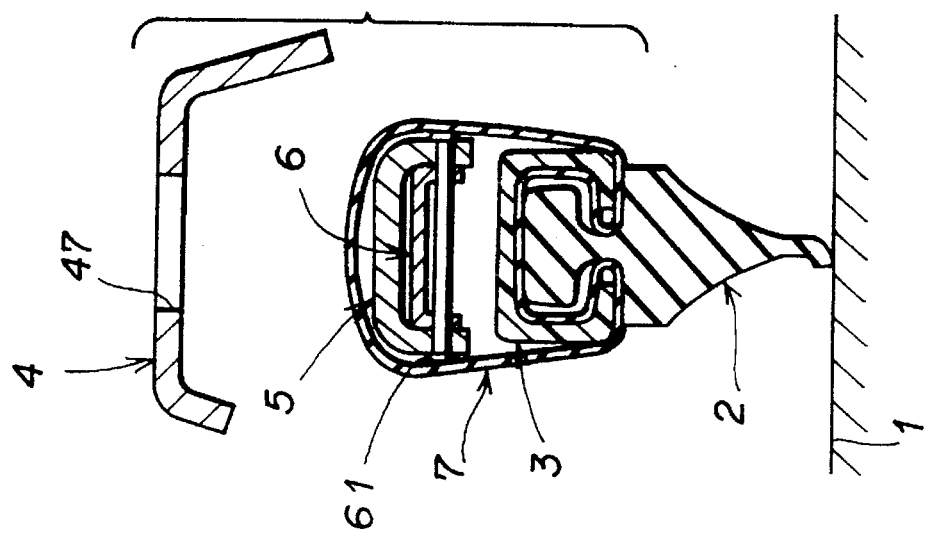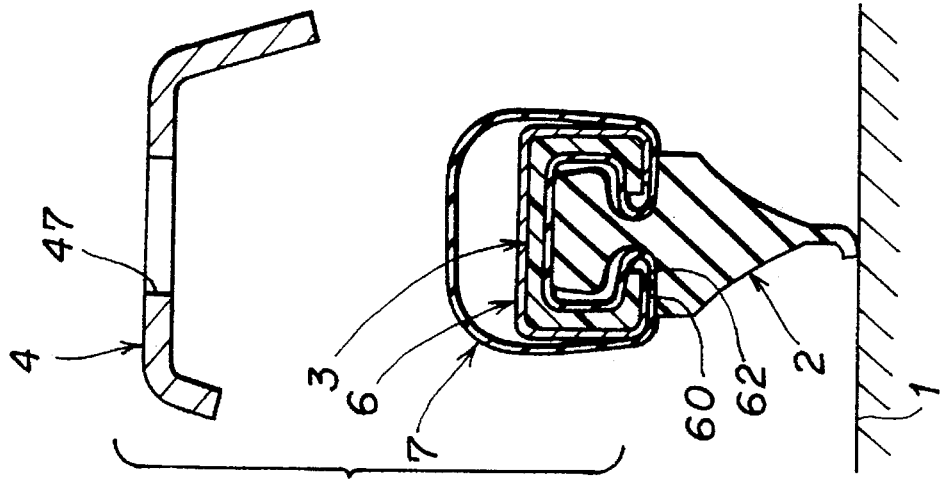

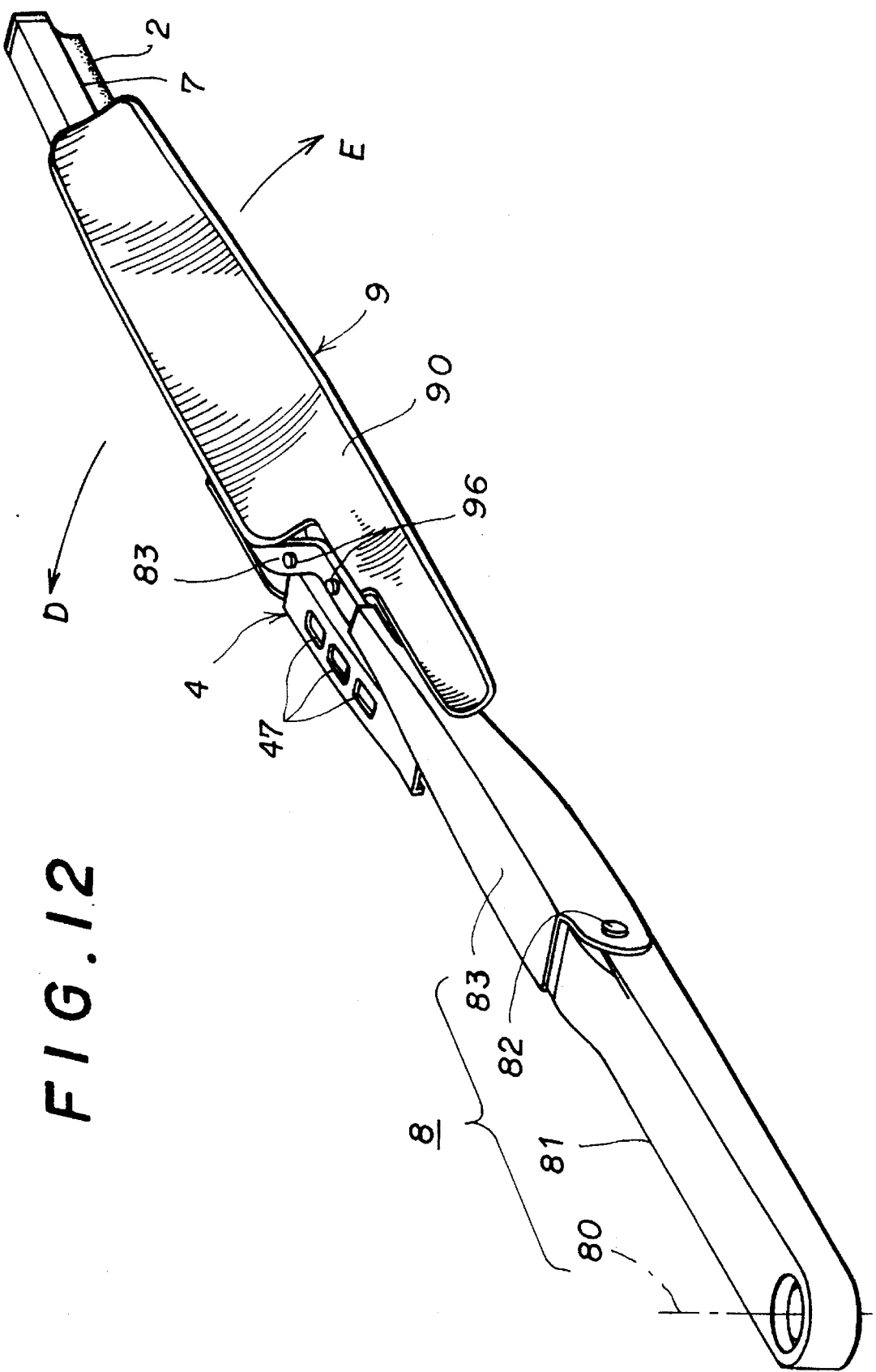

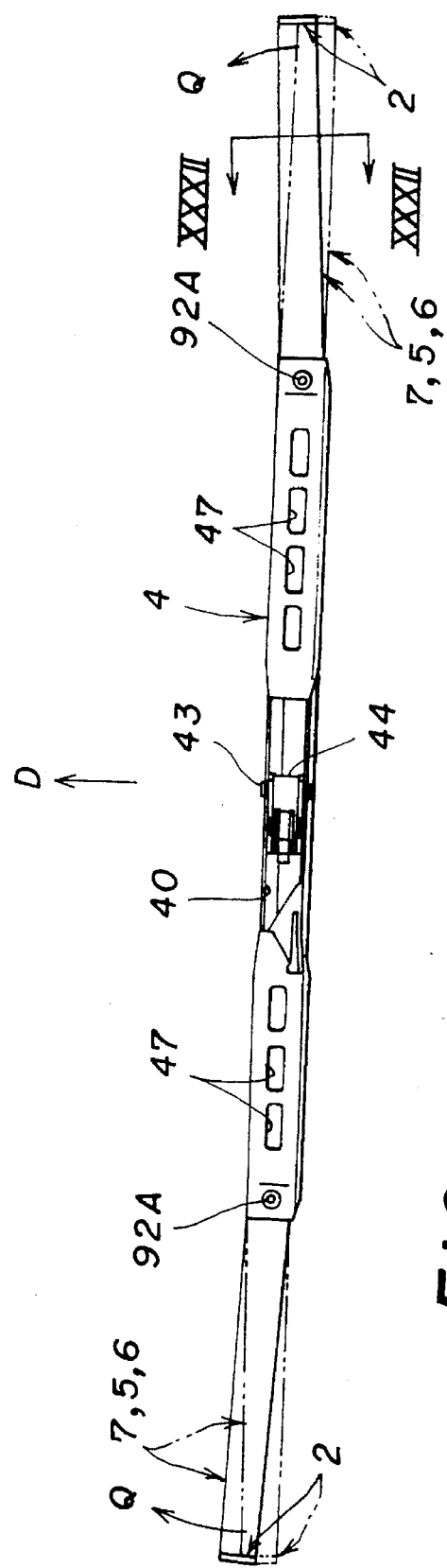
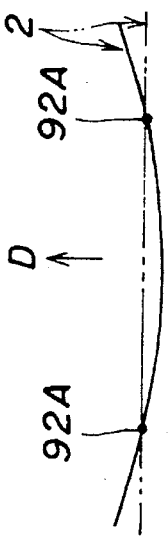
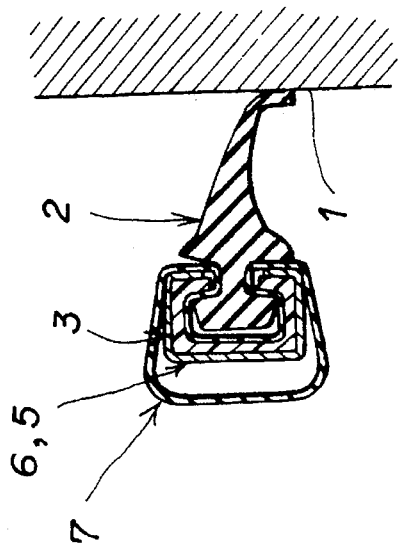

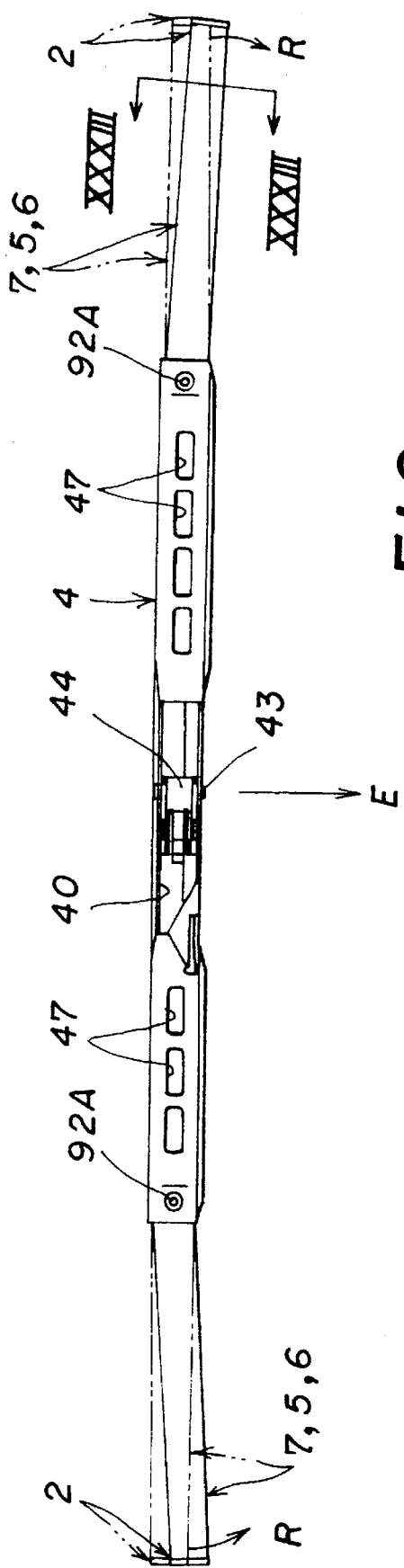
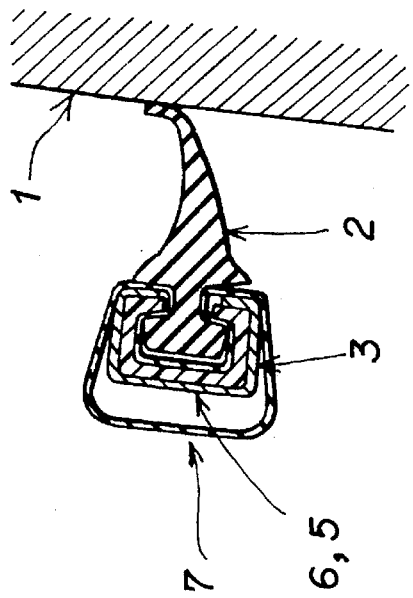

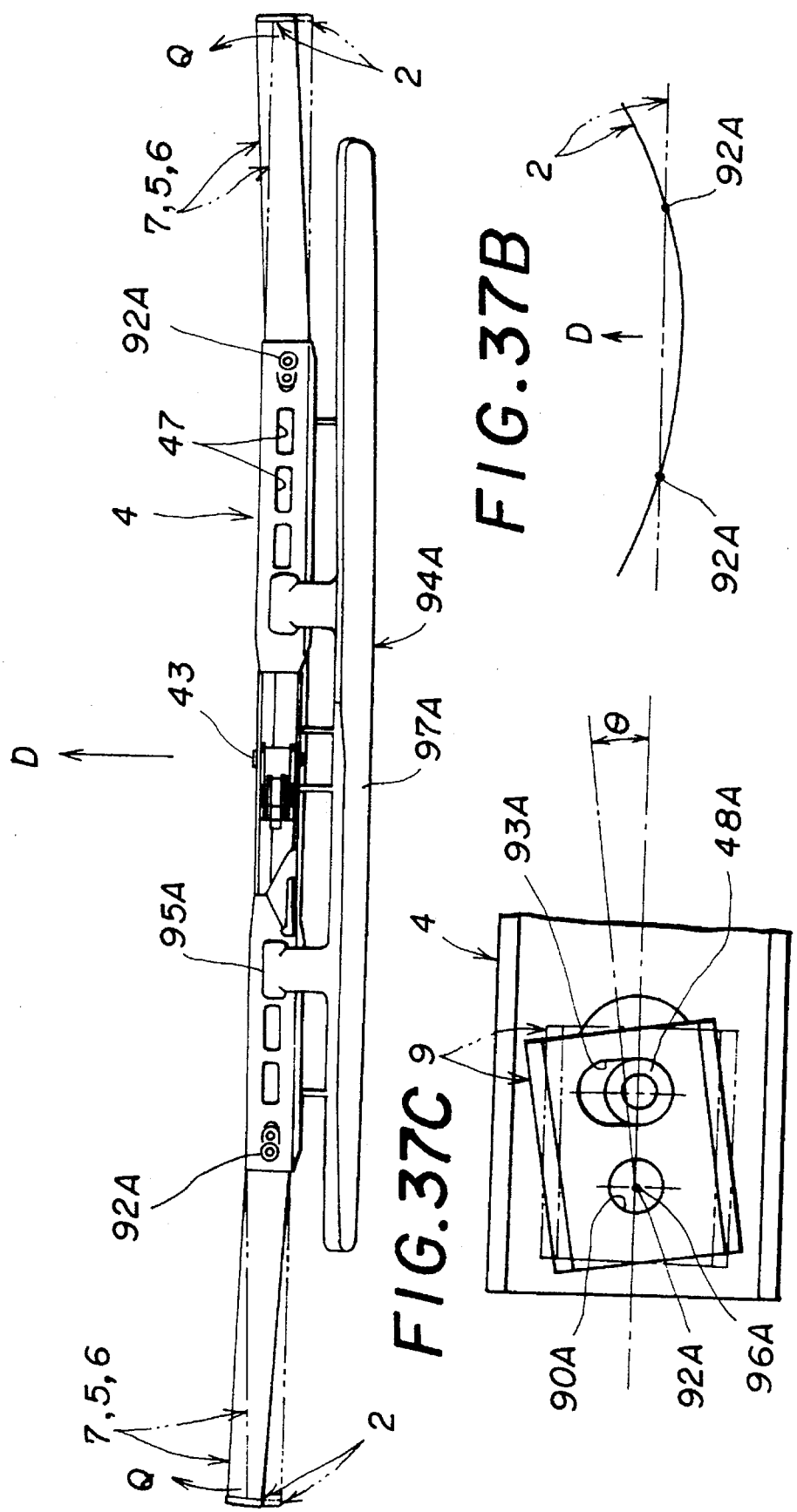

VEHICLE WINDSHIELD WIPER BLADE ASSEMBLY AND WIPER SYSTEM

BACKGROUND OF THE INVENTION a) Field of the Invention

The present invention relates to a vehicle windshield wiper blade assembly and a wiper system including such a wiper blade assembly, suitably usable in cold districts or winter season, and more particularly, to a vehicle windshield wiper blade assembly and wiper system, which can be operated with no adhesion of ice, snow or the like (hereafter "snow") to the wiper blade and with a constantly high wiping efficiency when the vehicle is running at a high speed.

Also the present invention relates to a vehicle windshield wiper blade assembly which can smoothly follow and positively wipe the surface of a vehicle windshield including surfaces of which the radii of curvature are relatively small.

b) Prior Art Statement

For clear understanding how the vehicle windshield wiper blade assembly and a wiper system including such a wiper blade assembly are constructed and work, a typical one of the conventional ordinary vehicle windshield wiper blade assemblies and wiper systems will be described with reference to FIGS. 1 through 4.

In FIGS. 1–4 an automobile windshield to be wiped by the wiper blade ("windshield") is generically indicated by the reference numeral 1. Generally, the windshield 1 includes a plurality of surfaces different in radius of curvature from each other to meet the aerodynamic and esthetic requirements.

The windshield I is wiped by a blade rubber 2 made of, for example, a rubber. As shown in FIG. 3, the blade rubber 2 comprises a wiping portion 20 intended to wipe the windshield I and of which the cross section has the general form of an inverted triangle, a retaining portion 21 of which the cross-sectional shape is generally a trapezoid, and a neck portion 22 formed integrally with, and between, the top of the wiping portion 20 and the bottom of the retaining portion 21. The wiping portion 20 of the blade rubber 2 has formed at the free end (bottom) thereof a lip portion which is kept tilted to the left (or right) as shown in FIG. 3 as always pressed to the windshield 1 by the elastic material forming a wiper drive 8.

The blade rubber 2 is held by a backing channel 3 made of, for example, a synthetic resin. As shown in FIG. 3, the backing channel 3 has a generally C-shaped cross-section which fits on the retaining portion 21 of the blade rubber 2 and has formed in the bottom thereof a cut 30 of which the width is somewhat larger than the thickness of the neck portion 22 of the blade rubber 2. The backing channel 3 is loosely fitted on the retaining portion 21 of the blade rubber 2 so as to be movable in relation to the retaining portion 21. Thus the neck portion 22 of the blade rubber 2 is so positioned in the cut 30 in the backing channel 3 as to be movable in relation to the backing channel 3. The blade rubber 2 is thus held by the backing channel 3. However, it should be noted that the backing channel 3 may not always be necessary or it may be made of a metal.

The reference numeral 4 indicates a primary lever made of a thin steel plate, for example, bent to have a top plate portion and right and left side plate portions. The primary lever 4 has formed nearly in the center of the top plate portion thereof an opening 40 in which there is set a clip 44. The clip 44 is pivotably installed to the right and left side plate portions corresponding to the opening 40 in the primary lever 4 by means of a rivet 43 generally parallel to the windshield 1. In addition, the primary lever 4 has formed in the top plate portion thereof to the right and left of the opening 40 a plurality (e.g., 7) of generally rectangular through-holes 47. The through-holes 47 may not always be formed.

The reference numeral 5 indicates a secondary lever also made of a thin steel plate, for example, bent to have a top plate portion and right and left side plate portions. Two such levers 5 are provided. Each of the secondary levers 5 has an engagement pawl 50 formed at one end thereof (outer one at which the secondary levers 5 are installed to the primary lever 4). Each of these two secondary levers 5 is pivotably installed nearly at the center thereof to each end of the primary lever 4 by means of a rivet 51 generally parallel to the windshield 1.

The reference numeral 6 indicates a yoke also made of a thin steel plate, for example, bent to have a top plate portion and right and left side plate portions. Two such yokes 6 are provided. Each of the yokes 6 has an engagement pawl 60 formed at either end thereof. Each of these yokes 6 is pivotably installed nearly at the center thereof to the other end of each secondary lever 5 (inner one at which the yokes 6 are installed to the primary lever 4) by means of a rivet 61 generally parallel to the windshield 1.

The engagement pawls 50 of the secondary levers 5 and those 60 of the yokes 6 are made by bending their respective lower ends inwardly about 90 degrees. The clearances 52 and 62 between the ends of the engagement pawls 50 and 60, respectively, thus bent are a little larger than the thickness of the neck portion 22 of the blade rubber 2. The engagement pawls 50 and 60 of the secondary levers 5 and yokes 6, respectively, are loose-fitted on the backing channel 3 so as to be movable in relation to the latter. The neck portion 22 of the blade rubber 2 is so inserted in the spaces 52 between the inner ends of the engagement pawls 50 of the secondary levers 5 and the spaces 62 between the ends of the engagement pawls 60 of the yokes 6 as to be movable in relation to the pawls 50 and 60. In this manner, the engagement pawls 50 at the outer end of the secondary levers 5 and the engagement pawls 60 at the opposite ends of the yokes 6 are engaged on the blade rubber 2 and backing plate 3, respectively.

As having been described in the foregoing, the blade rubber 2 is supported at 6 points, namely, with two engagement pawls 50 of the secondary levers 5 and four engagement pawls 60 of the yokes 6. When a yoke 6 is installed to either end of each of the two secondary levers 5 and the blade rubber 2 is supported at either end of each of the four yokes 6, the blade rubber 2 is supported at 8 points. Moreover, in case the blade rubber 2 is supported at either end of each of the two secondary levers 5, not by means of the yokes 6, the supporting points of the blade rubber 2 count 4 in number.

The aforementioned secondary levers 5 and yokes 6 support together the blade rubber 3 (and the backing channel 3) at a plurality of points (6 points in the above-mentioned case).

The blade rubber 2, backing channel 3, primary lever 4, secondary levers 5 and yokes 6 form together a wiper blade (or wiper blade assembly).

In FIG. 1, the reference numeral 8 indicates a wiper drive. The wiper drive 8 is coupled to a drive shaft (not shown) of a motor (not shown), and it consists of a wiper shaft 80 extending generally perpendicularly to the windshield 1, arm head 81 fixed to the wiper shaft 80, wiper arm 83 installed pivotably to the arm head 80 by means of a hinge pin 82 nearly perpendicular to the wiper shaft 80, and an elastic member (not shown) interposed between the wiper arm 83 and arm head 81 to always press the wiper arm 83 toward the windshield 1. The end of the wiper arm 83 is removably connected to the clip 44 of the primary lever 4 of the wiper blade assembly.

When the wiper blade is attached to the wiper arm 83 of the wiper drive 8, a vehicle windshield wiper system is formed.

The vehicle windshield wiper system thus assembled functions as will be described below:

When the wiper motor of the wiper drive is put into run, the wiper blade will reciprocally move at a high speed, at a low speed or intermittently in the direction of arrow D in FIGS. 2 through 4 (opening direction, namely, forward) and in the direction of arrow E (closing direction, namely, backward) to wipe the windshield I with the wiping portion 20 of the blade rubber 2. In this windshield wiper system, when the blade rubber 2 is stopped from reciprocal wiping motion and the wiper blade is placed in the home position (when the wiper drive 8 is stopped), the wiper blade is directed downward in the direction of arrow E.

A vehicle wiper system for use in cold districts or winter season is known from the disclosure in the Japanese Unexamined Utility Model Publication No. 49-148627. In this vehicle windshield wiper system, a stay connecting a wiper blade body (comprising a blade rubber, support members and a cover covering the support member and a part of the blade rubber) and the wiper arm to each other is formed like such a vane that the wiper blade body is pressed toward the windshield surface under a window pressure applied to the stay when the vehicle runs at a high speed. In this vehicle wiper system, the cover provided prevents snow from adhering to the support members and the vane-like stay prevents the wiper blade body from leaving the windshield surface as caused by a wind pressure applied when the vehicle runs.

SUMMARY OF THE INVENTION

The present invention has a primary object to overcome the above-mentioned drawbacks of the prior art by providing an improved vehicle windshield wiper blade assembly and an improved vehicle wiper system including such a wiper blade assembly, destined for use in cold districts or in winter season and which can be operated with no adhesion of snow to the wiper blade and with a constantly high wiping efficiency when the vehicle is running at a high speed.

The above object can be accomplished by composing a wiper blade of of a primary lever, support members, blade rubber and a cover, fixing a blade spoiler to the wiper blade in order to press the wiper blade to the windshield when the car is running, defining a space between the blade spoiler and wiper blade and by placing the lower edge of the blade spoiler opposite to the windshield in a position nearer to the windshield than to the cover bottom.

The above object can be accomplished by fixing a blade spoiler to the wiper arm of a wiper driver, defining a space between the blade spoiler and wiper blade and by placing the lower edge of the blade spoiler opposite to the windshield in a position nearer to the windshield than to the cover bottom.

More specifically, the blade spoiler in the present invention reduces the amount of snow directly applied to the wiper blade, thus permitting to prevent snow from adhering to the wiper blade. Since the lower edge of the blade spoiler is located nearer to the windshield than to a clearance caused between the blade rubber and cover when the wiper is in operation (when the blade rubber is reciprocally wiping the windshield), snow can be prevented from entering into the space between the blade rubber and cover, thereby permitting to prevent the wiping efficiency of the wiper from being reduced due to the adhesion of snow to the wiper blade.

Further, the blade spoiler in the present invention reduces the wind applied directly to the wiper blade and thereby prevents the wiper blade from leaving the windshield when the car is running at a high speed.

Also the above object can be accomplished by providing a vehicle wiper blade assembly which can smoothly follow and positively wipe a windshield having a relatively small radius of curvature.

The above object can be accomplished by coupling the primary lever and support members to each other by means of shaft members generally perpendicular to the windshield at the opposite ends of the primary lever so that the support members are pivotable in a direction nearly parallel to the windshield (as in Claim 9). Since the blade rubber can be made in such a curved form as to go ahead, at the both ends thereof, of the central portion due to the friction between the blade rubber and windshield when the blade rubber is wiping the latter, it can smoothly follow and positively wipe a windshield having srufaces of which the radii of curvature are relatively small.

BRIEF DESCRIPTION OF THE DRAWINGS

FIGS. 1 through 4 show together a conventional vehicle wiper blade assembly and vehicle wiper system, of which FIG. 1 is a side elevation, FIG. 2 is a perspective view, FIG. 3 is a sectional view taken along the line III—III in FIG. 2, showing the wiper blade being wiping in the opening direction, and FIG. 4 is a plan view.

FIGS. 5 through 11 show together a vehicle wiper blade assembly according to a first embodiment of the present invention, of which FIG. 5 is a perspective view, FIG. 6 is a sectional view taken along the line VI—VI in FIG. 5, showing the wiper blade being sweeping in the closing direction, FIG. 7 is a sectional view taken along the line VII—VII in FIG. 5, showing the wiper blade is seeping in the closing direction, FIG. 8 is a view from the direction VIII in FIG. 5, FIGS. 9 to 11 are sectional views, respectively, taken along the lines IX—IX, X—X and XI—XI, respectively, in FIG. 5.

FIGS. 12 through 16 show together the vehicle wiper system, accordomg to a second embodiment of the present invention, of which FIG. 12 is a perspective view of the wiper blade fixed to the wiper arm to which the blade spoiler is fixed, FIG. 13 is a perspective view showing only the wiper blade in FIG. 12, FIG. 14 is a perspective view showing only the wiper arm to which the blade spoiler is fixed, FIG. 15 is a view from the direction XV in FIG. 14, and FIG. 16 is a view from the direction XVI in FIG. 14.

FIGS. 17 through 21 show together a vehicle wiper blade assembly according to a third embodiment of the present invention, of which FIG. 17 is a perspective view of the wiper blade being sweeping in the closing direction or being stopped, FIG. 18 is an exploded perspective view showing the relationship among the primary lever, cover, secondary lever, yoke, holder and pop rivet, FIG. 19 is an exploded perspective view, enlarged in scale, of the essential portion, FIG. 20 is a sectional view taken along the line XX—XX in FIG. 17, and FIG. 21 is a sectional view taken along the line XXI—XXI in FIG. 17;

FIG. 22 is a sectional view of the conventional wiper blade assembly, in which the cover height thereof is compared with that of the wiper blade assembly according to the present invention;

FIGS. 23 through 27 show together a vehicle wiper blade assembly according to a fourth embodiment of the present invention, of which FIG. 23 is a perspective view of the wiper blade being sweeping in the closing direction or being stopped, FIG. 24 is an exploded perspective view showing the relationship among the primary lever, cover, secondary lever, yoke and holder, FIG. 25 is a perspective view, enlarged in scale, of a portion of the primary lever, those of the holder and cover, a portion of the secondary lever and a portion of the yoke, FIG. 26 is a sectional view taken along the line XXVI—XXVI in FIG. 25, and FIG. 27 is a sectional view taken along the XXVII—XXVII in FIG. 23.

FIGS. 28 through 33C show together a vehicle wiper blade assembly according to a fifth embodiment of the present invention, of which FIG. 28 is a perspective view of the wiper blade being sweeping in the closing direction or being stopped, FIG. 29 is an exploded view showing the relationship among the primary lever, cover, secondary lever, yoke, holder and pop rivet, FIG. 30 is an exploded perspective view, enlarged in scale, of an essential portion, FIG. 31 is a plan view, FIG. 32A is a plan view of the wiper blade being sweeping in the opening direction, FIG. 32B is an explanatory drawing of the wire blade being sweeping in the opening direction (the blade rubber being curved), FIG. 32C is a sectional view taken along the line XXXII—XXXII in FIG. 32A, FIG. 33A is a plan view of the wiper blade being sweeping in the closing direction, FIG. 33B is an explanatory drawing of the wiper blade being wiping in the closing direction (the blade rubber being curved), and FIG. 33C is a sectional view taken along the line XXXIII—XXXIII in FIG. 33A;

FIGS. 34 through FIG. 38C show together a vehicle wiper blade assembly according to a sixth embodiment of the present invention, of which FIG. 34 is an exploded perspective view showing the relationship among the primary lever, secondary lever, yoke, holder and pop rivet, FIG. 35 is an exploded perspective view, enlarged in scale, of an essential portion, FIG. 36 is a plan view, FIG. 37A is a plan view of the wiper blade being sweeping in the opening direction, FIG. 37B is an explanatory drawing of the wiper blade being sweeping in the opening direction (the blade rubber being curved), FIG. 37C is a view from the direction XXXVII in FIG. 35, showing the wiper blade being wiping in the opening direction, FIG. 38C is a view from the direction XXXVIII in FIG. 35, showing the wiper blade being sweeping in the closing direction.

DETAILED DESCRIPTION OF THE PREFERRED EMBODIMENTS

Figure 1:
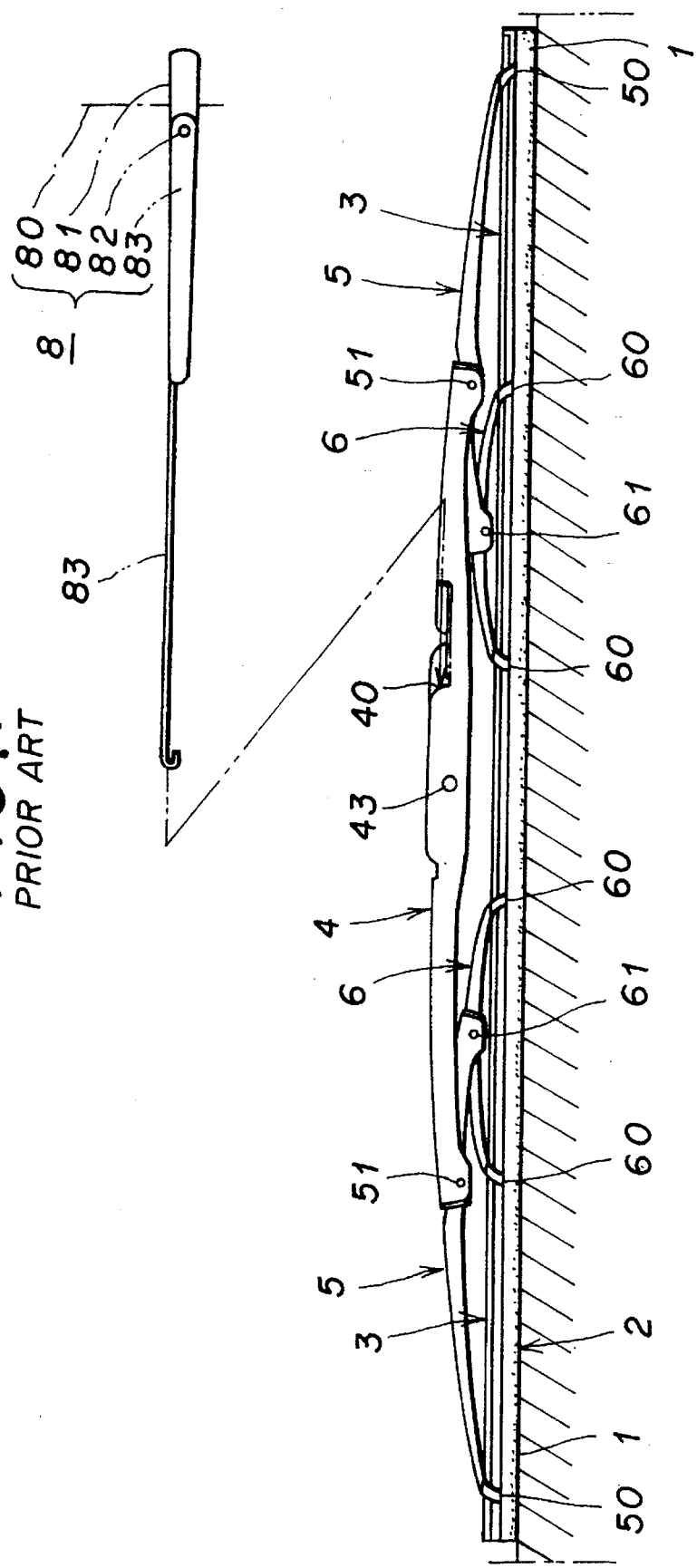
Figure 2:
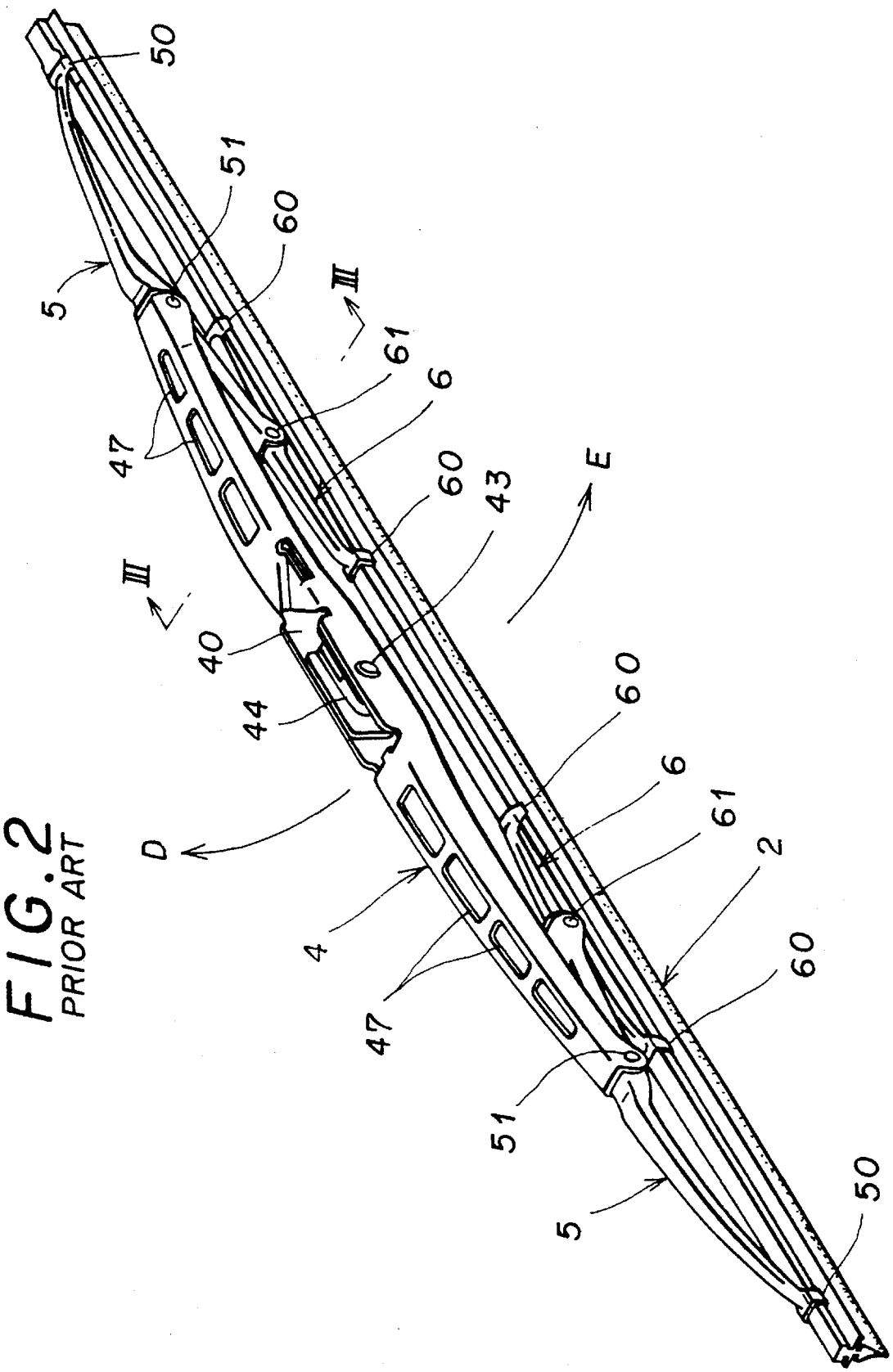
Figure 3:
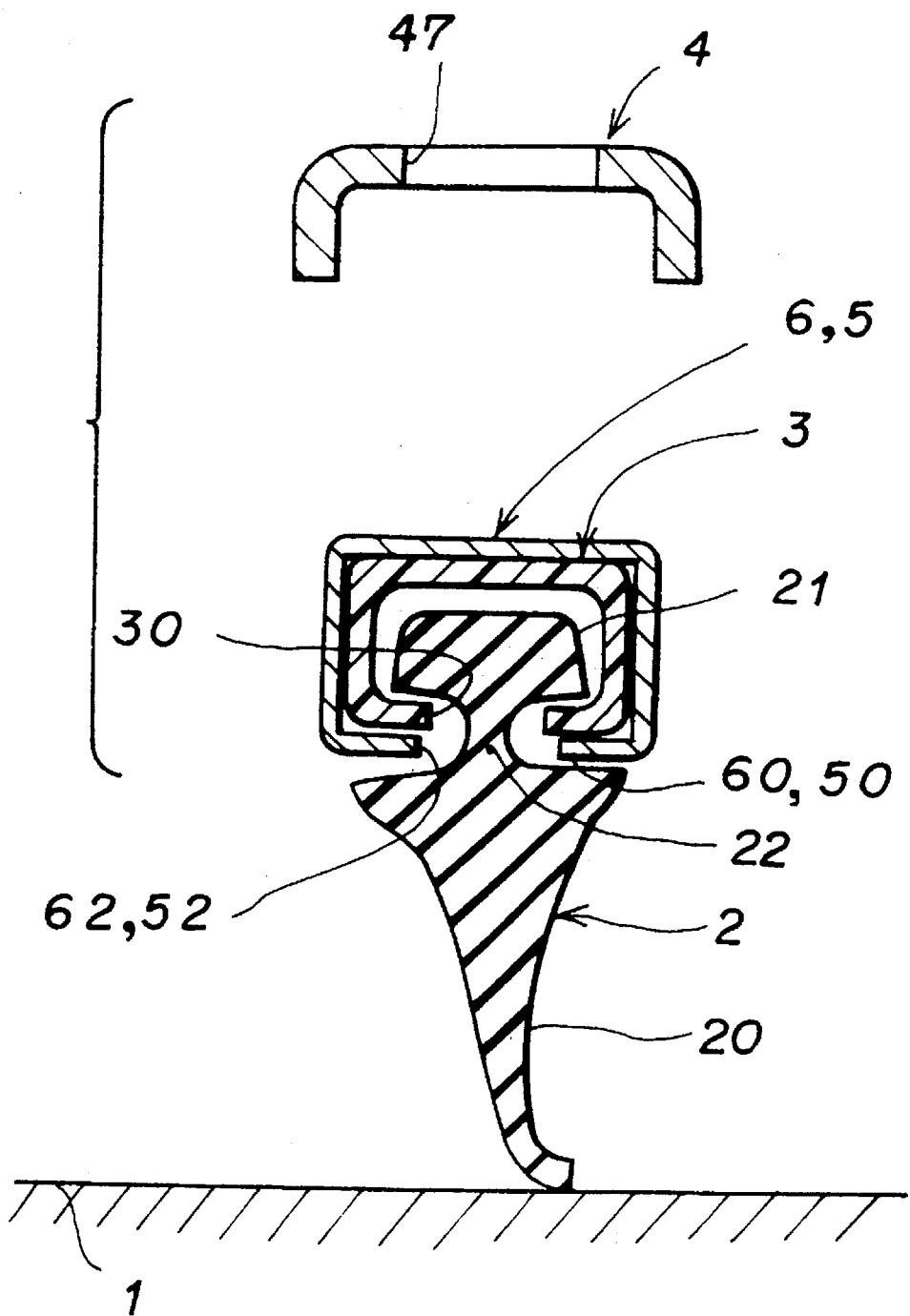
Figure 4:
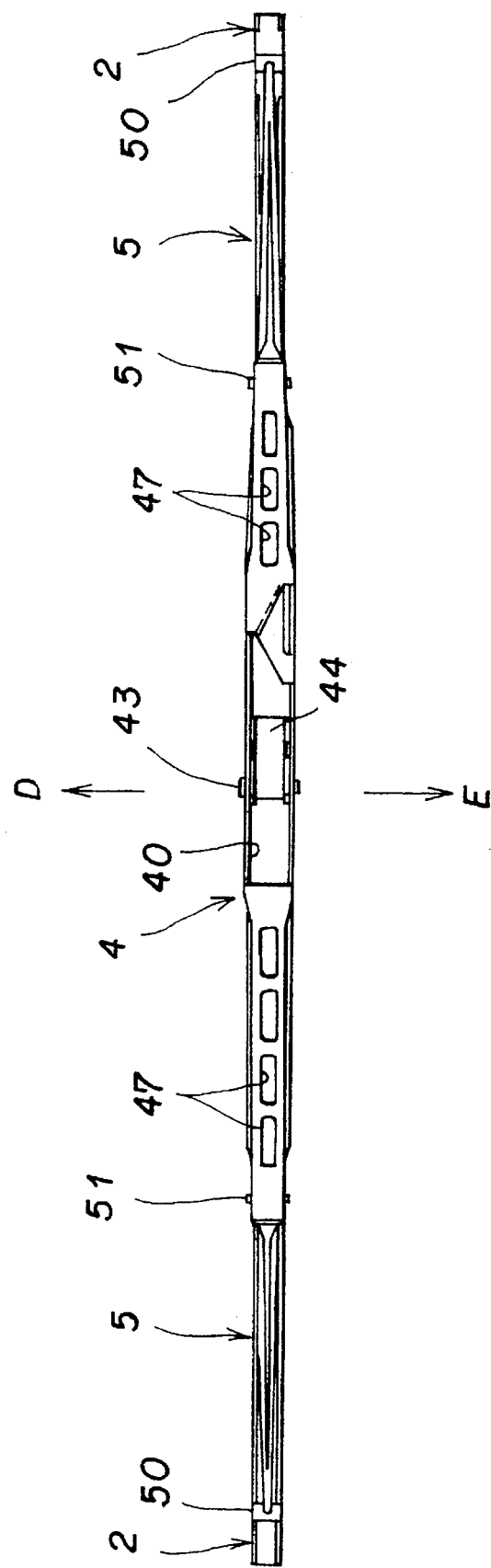

Referring now to FIGS. 5 through 11, the vehicle windshield wiper assembly according to the first embodiment of the present invention is illustrated. In these FIGS., the same and similar reference numerals as in FIGS. 1 through 4 indicate the same and similar elements as in FIGS. 1 through 4. Note that the elements in FIGS. 1 through 4 are somewhat different in shape from those in FIGS. 5 through 11. However, since the elements in FIGS. I through 4 are not functionally different from the corresponding ones in FIGS. 5 through 11, the same and similar elements in FIGS. 5 through 11 as in FIGS. 1 through 4 are indicated with same and similar reference numerals, respectively (this will also be true in the second embodiment).

Figure 6:
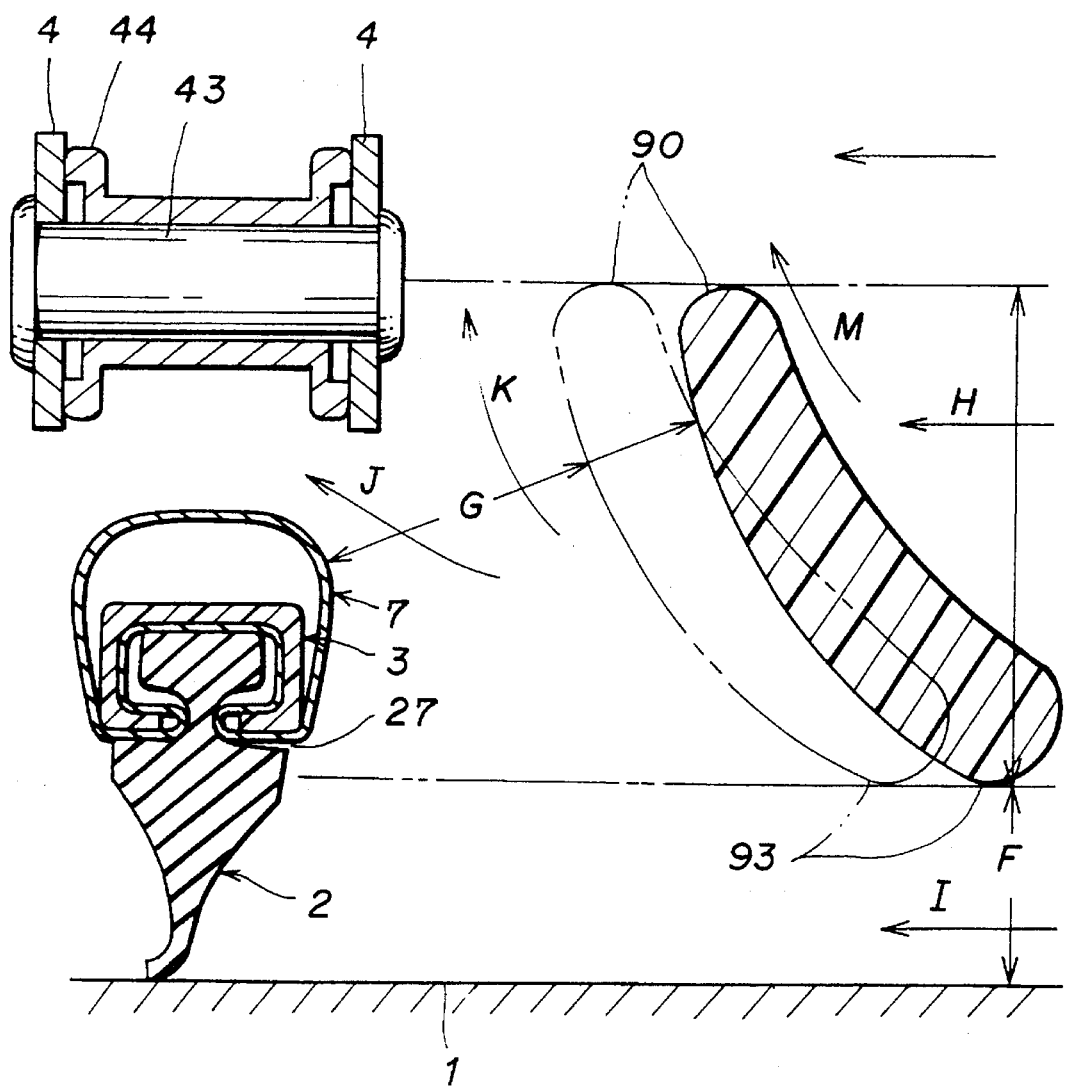
Figure 7:
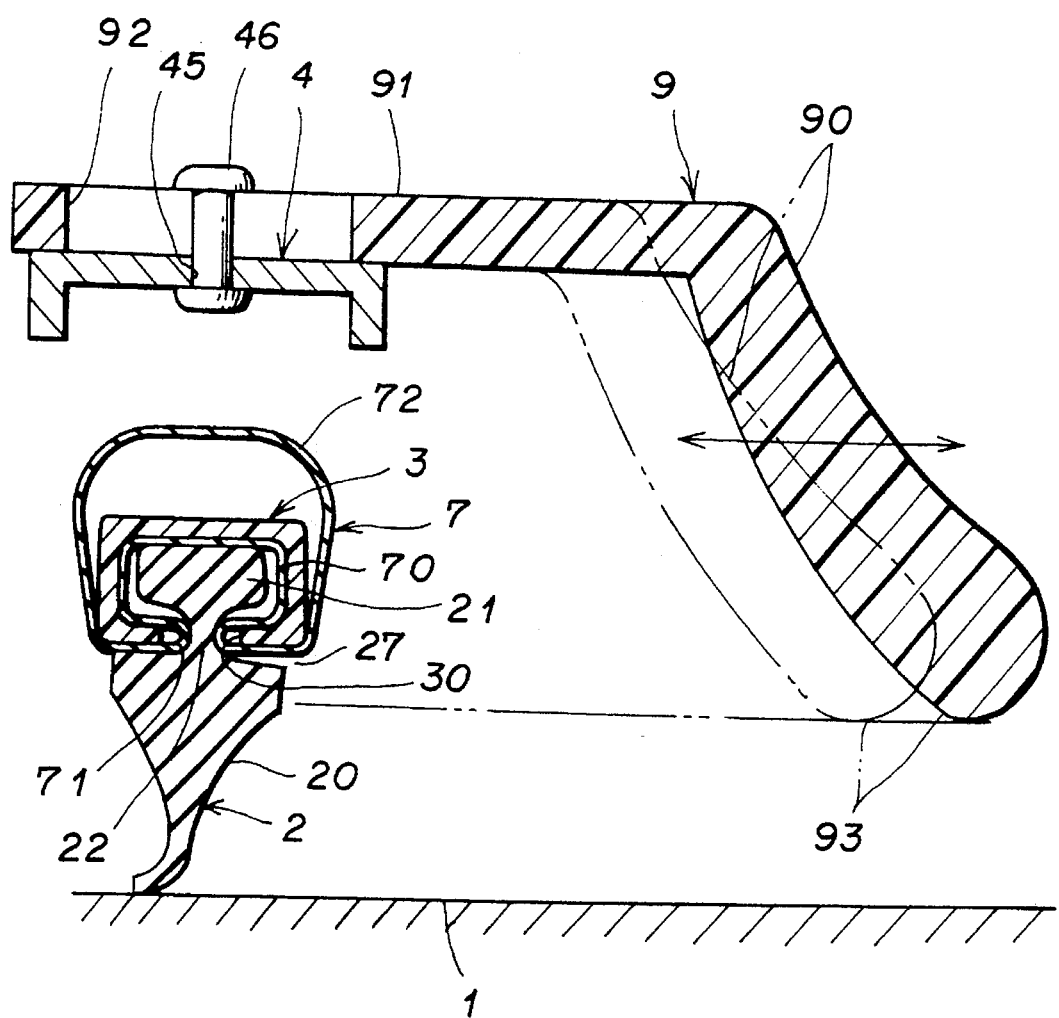
Figure 8:
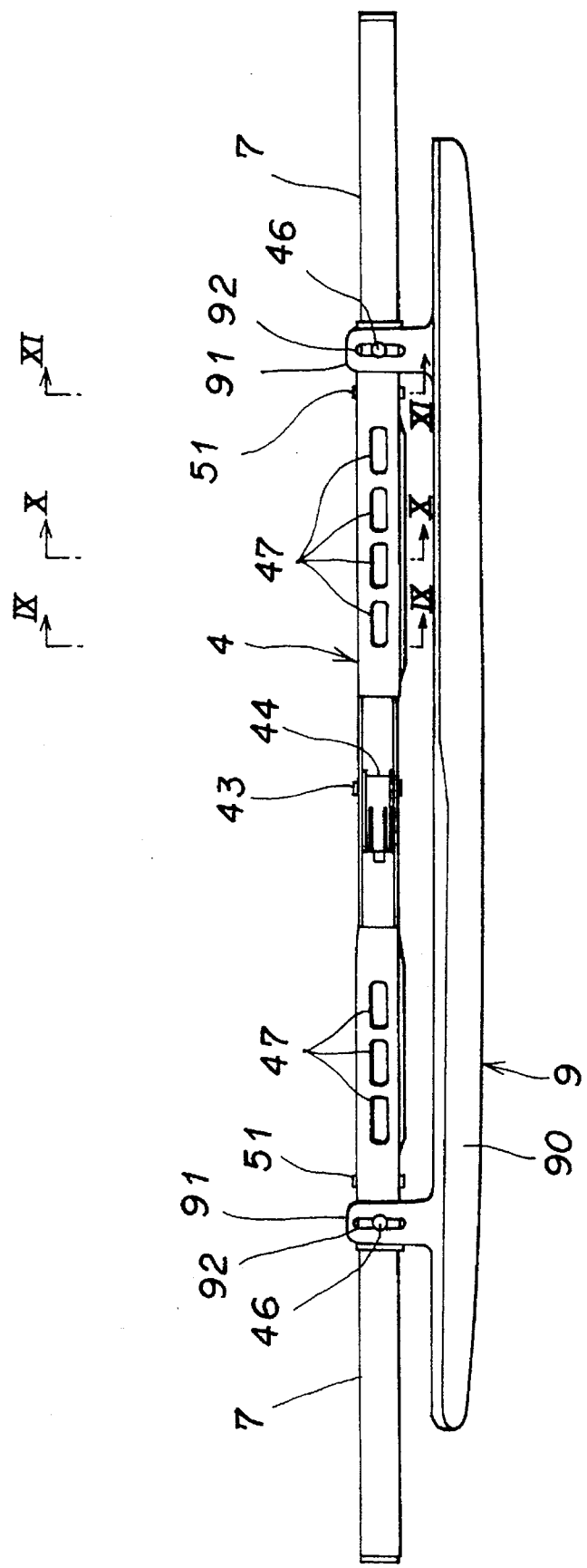
Figure 13:
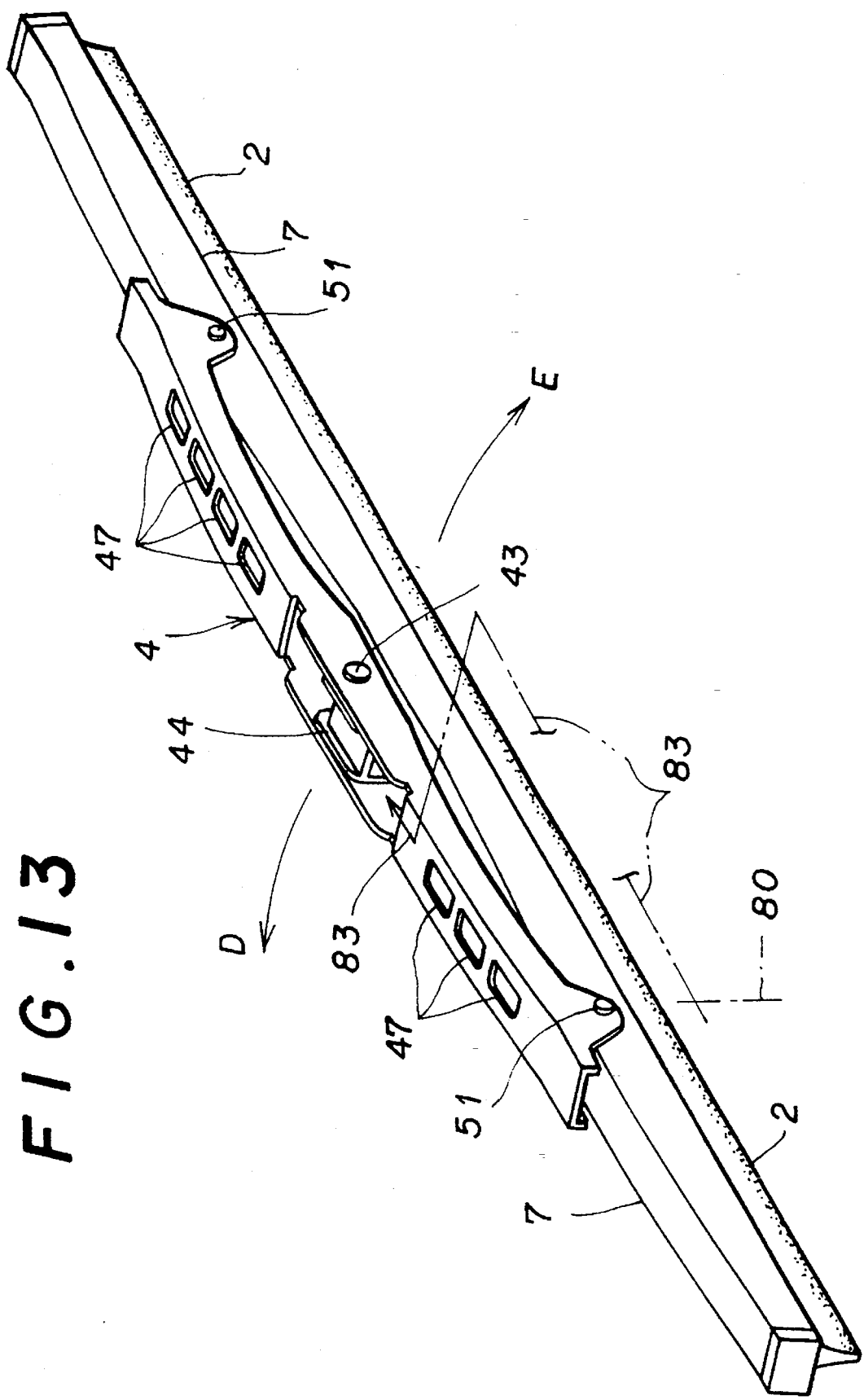
Figure 14:
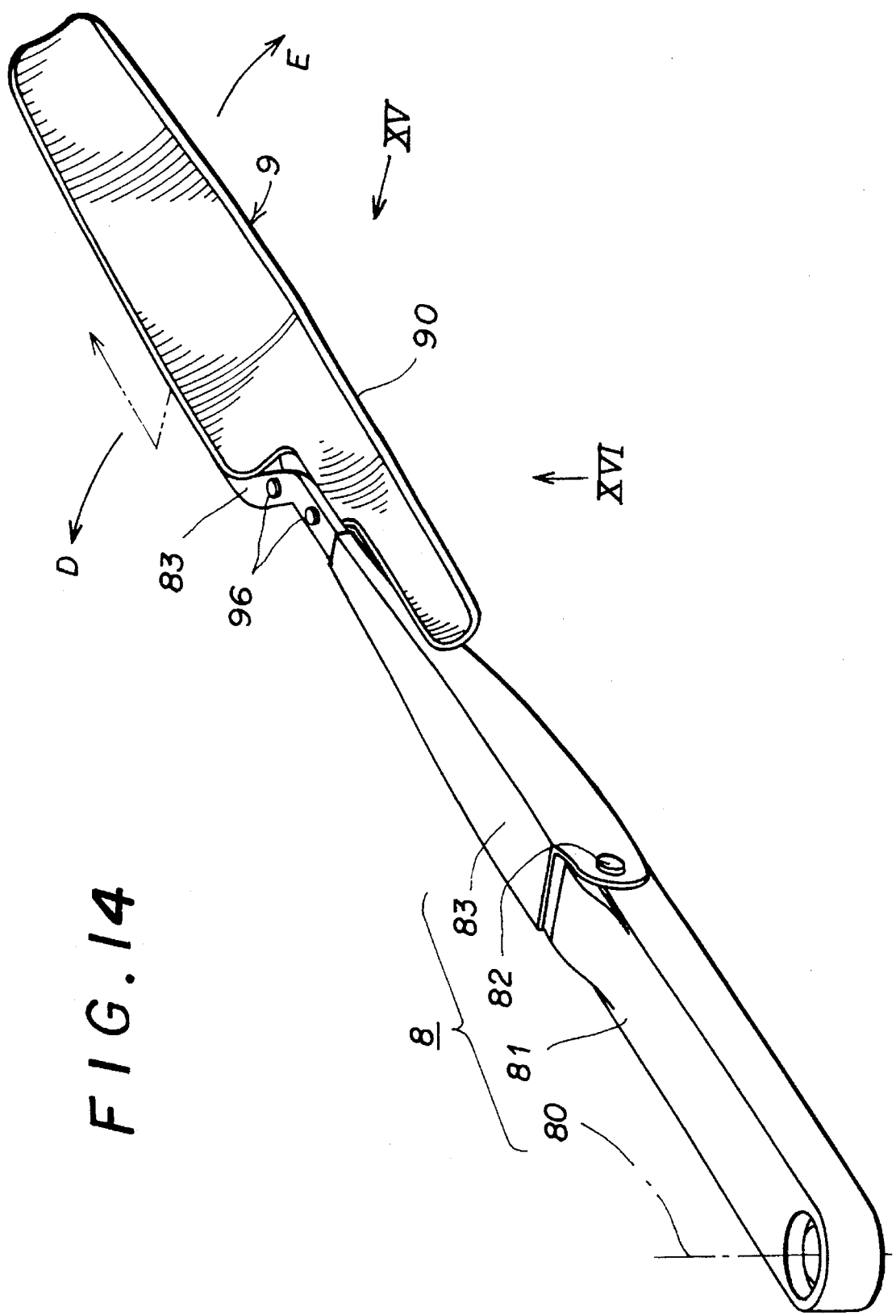
Figure 15:
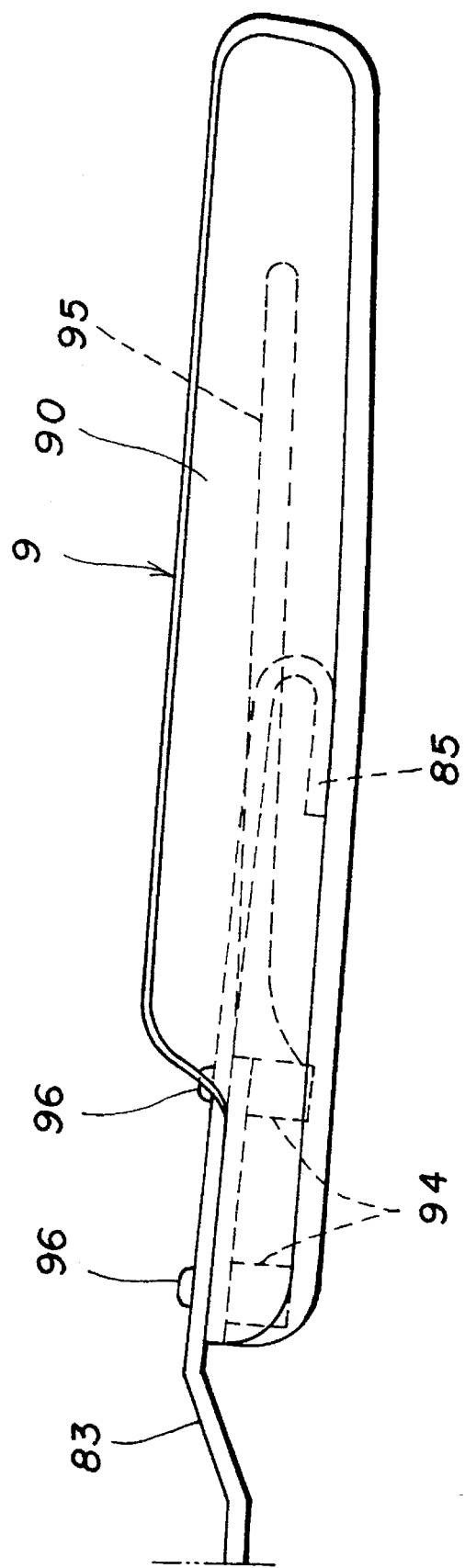
Figure 16:
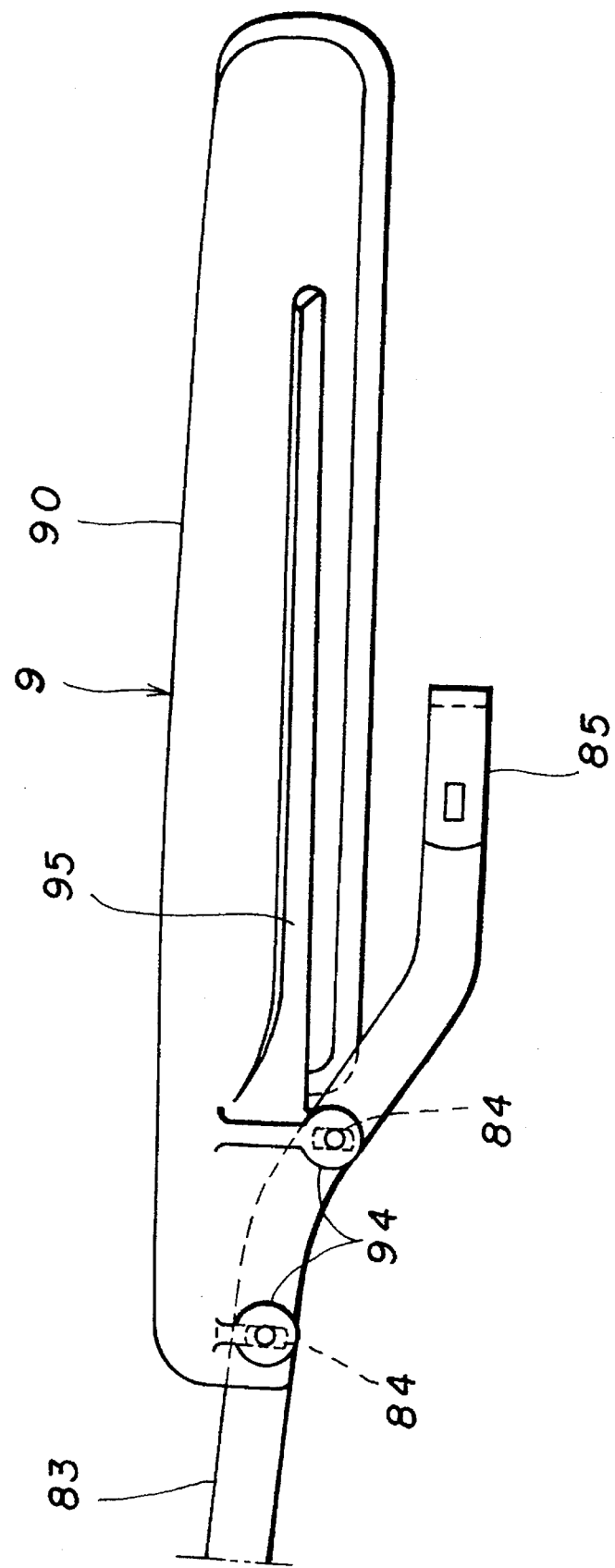
Figure 17:
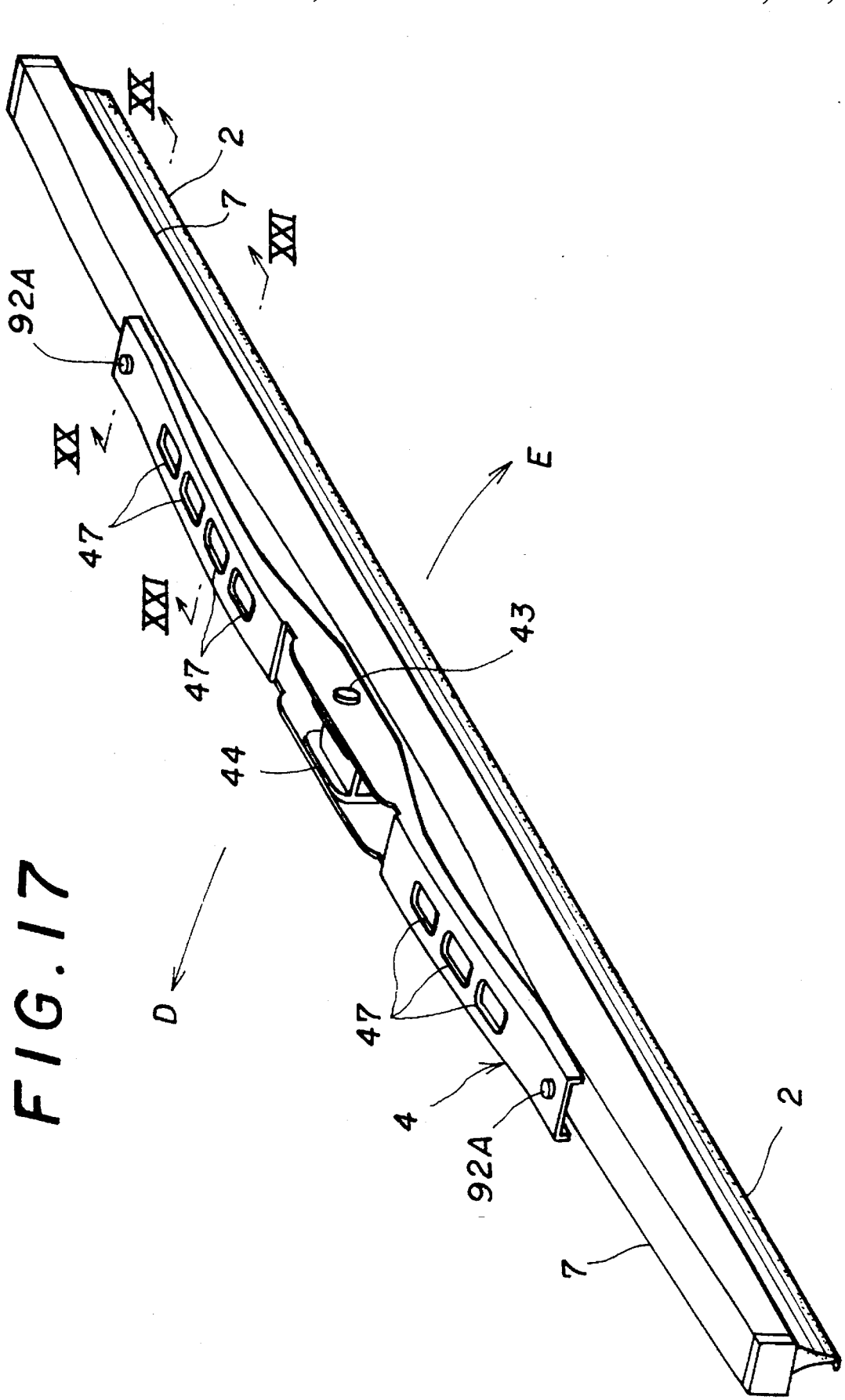
Figure 18:
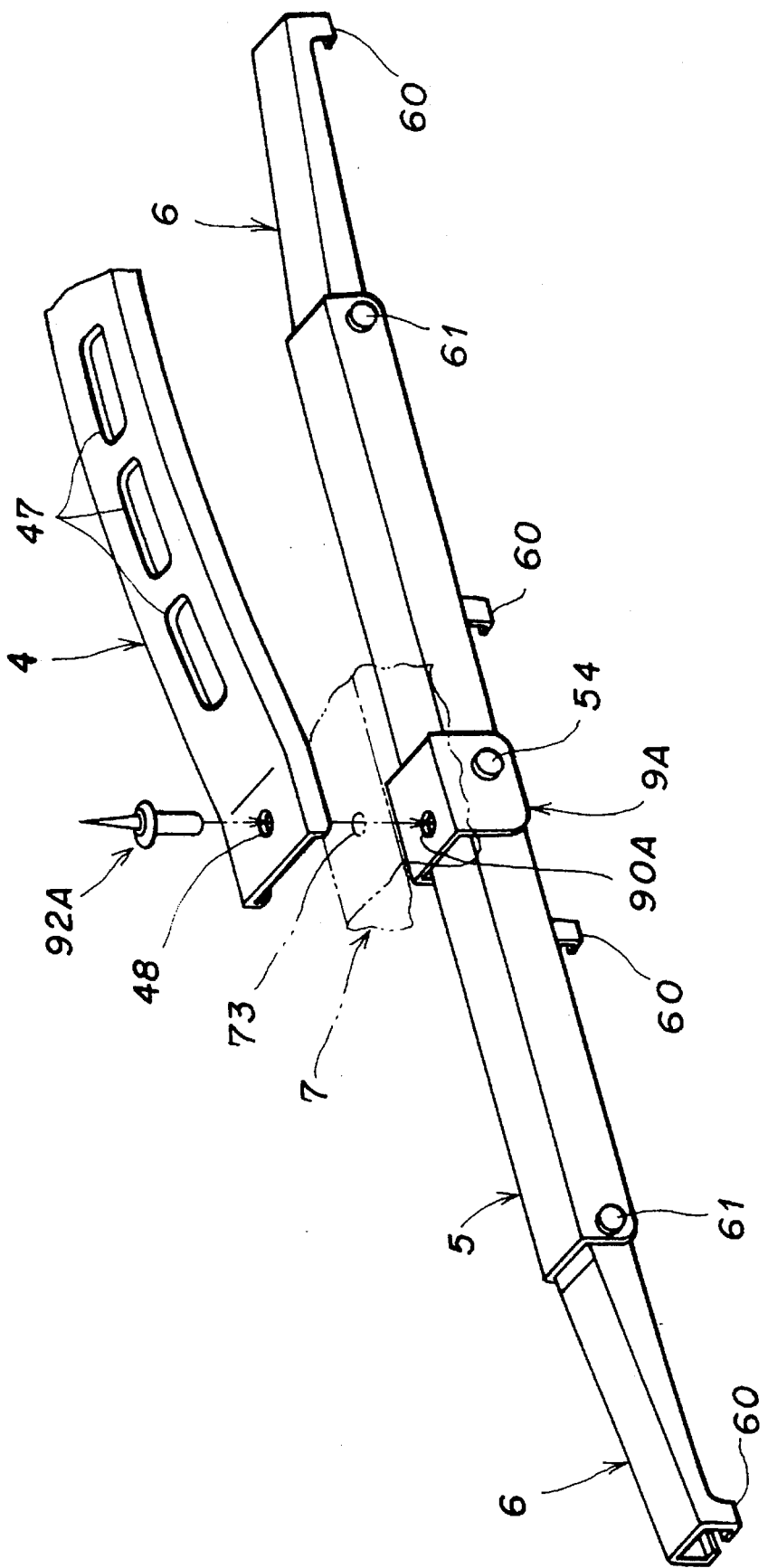
Figure 19:
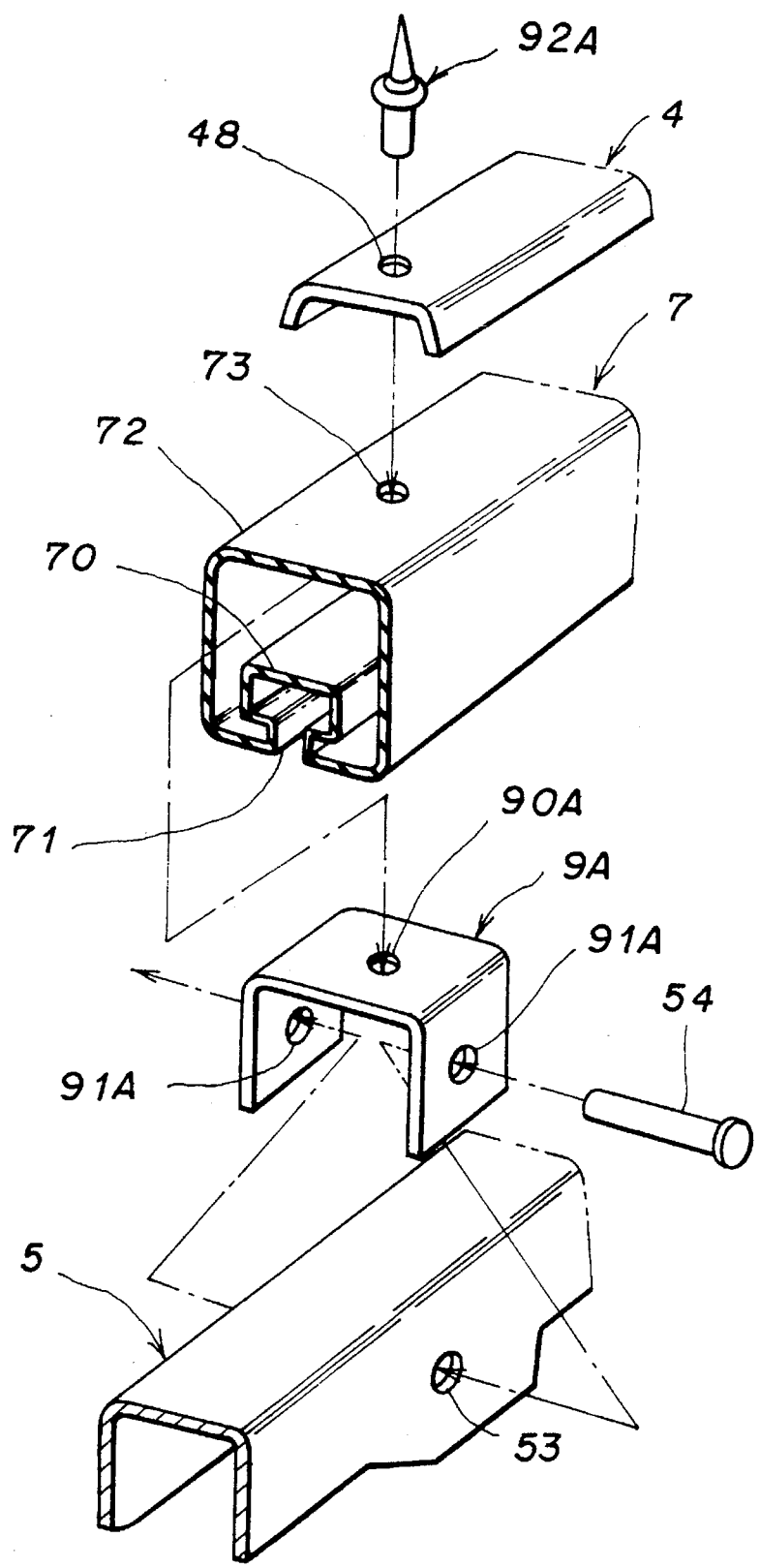
Figure 20:
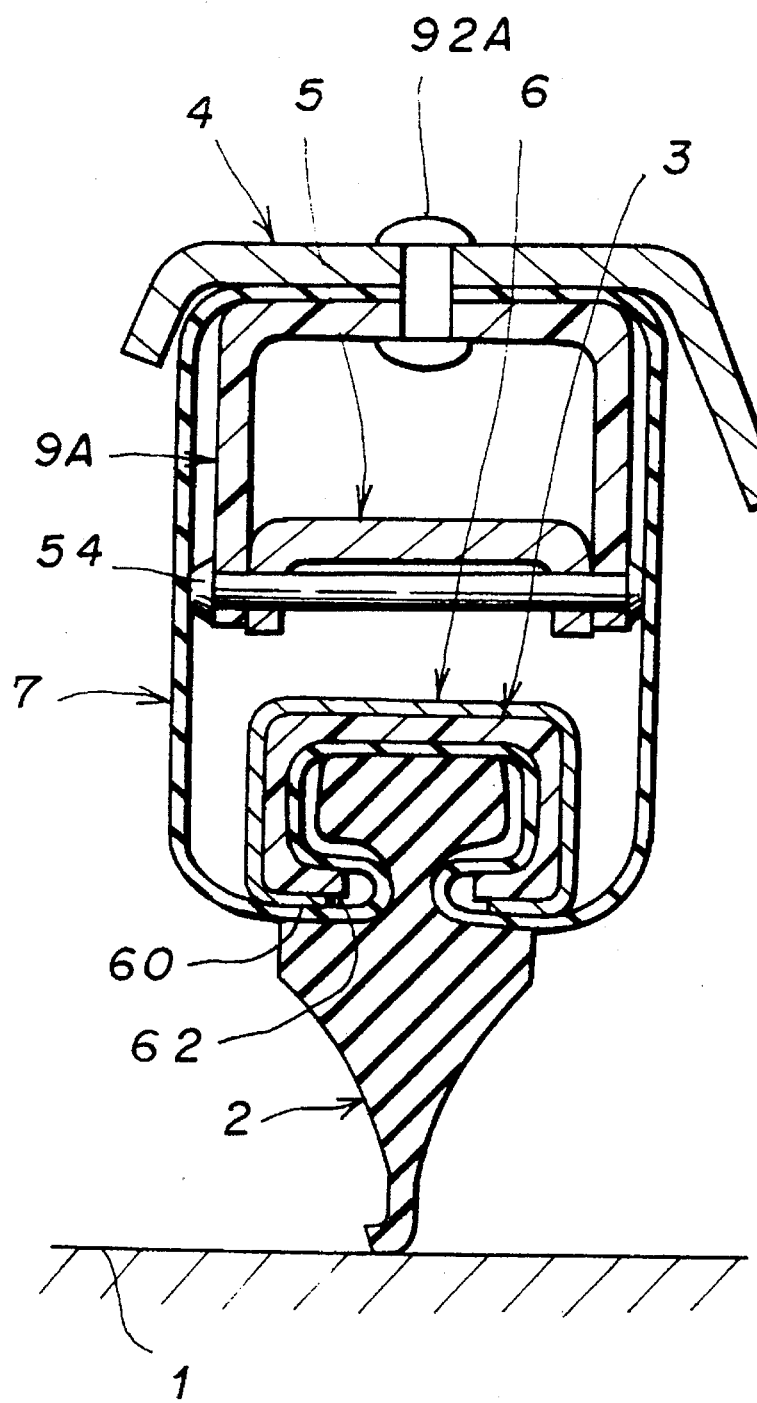

The reference numeral 7 indicates a cover made of an elastic material (rubber or elastomer). As shown in FIGS. 6, 7 and 9, the cover 7 has a portion 70 by which the inner wall of the backing channel 3 is covered, a portion 71 contiguous to the portion 70 and which is laid between the lower edges of the backing channel 3 and the neck portion 22 of the blade rubber 2, and a portion 72 contiguous to the portion 71 and by which the outer wall of the backing channel 3 is covered. More specifically, the portion 70 of the cover 7 has a generally C-shaped cross-section and is fitted on the retaining portion 21 of the blade rubber 2. Namely, it has an opening in the center of the bottom thereof, that is, at the portion 71. The portion 72 has also a generally C-shaped cross-section and is open in the center of the bottom thereof, namely, at the portion 71.

As mentioned above, the portion 70 of the cover 7 is fitted on the retaining portion 21 of the blade rubber 2, the portion 71 is laid at the neck portion 22 of the blade rubber 2, in the spaces 52 between the ends of the secondary levers 5 and in the spaces 62 between the ends of the yokes 6, and the portion 72 covers the primary lever 4, secondary levers 5 and yokes 6. After the primary lever 4 is covered with the portion 72 of the cover 7, a clip 44 is fixed to the primary lever 4 by a rivet 43 through the portion 72 of the cover 7.

The reference numeral 9 indicates a blade spoiler made of, for example, a synthetic resin. The blade spoiler 9 is fixed to the wiper blade. The blade spoiler 9 includes a main body 90 having a vane-like form, and fixtures 91 formed integrally with, and extending from, the upper edge nearly at both ends of the main body 90 in the direction of the width of the main body 90. The main body 90 has a slanted front side descending from the upper to lower edge and also curved concavely so that when the blade spoiler 9 is applied with a wind while the car is running, it will press the wiper blade to the windshield 1. Each of the fixtures 91 is generally rectangular and has longitudinally formed therein an elongated hole 92 through which a rivet 46 is inserted in the same direction as the wiper shaft 80.

On the other hand, the primary lever 4 has formed in the upper plate at either end thereof a small circular through-hole 45 through which the rivet 46 is inserted in the same direction of the wiper shaft 80.

In the first embodiment having been described in the above, the elongated hole 92 is formed in each of the fixtures 91 of the blade spoiler 9 and the small circular through-hole 45 is formed in the primary lever 4. However, the hole 45 in the primary lever 4 may be an elongated one and the hole 92 in the fixture 91 may be a small-circular tone. Both the holes in the primary lever 4 and fixtures 91 of the blade spoiler 9 may be elongated ones.

Figure 5:
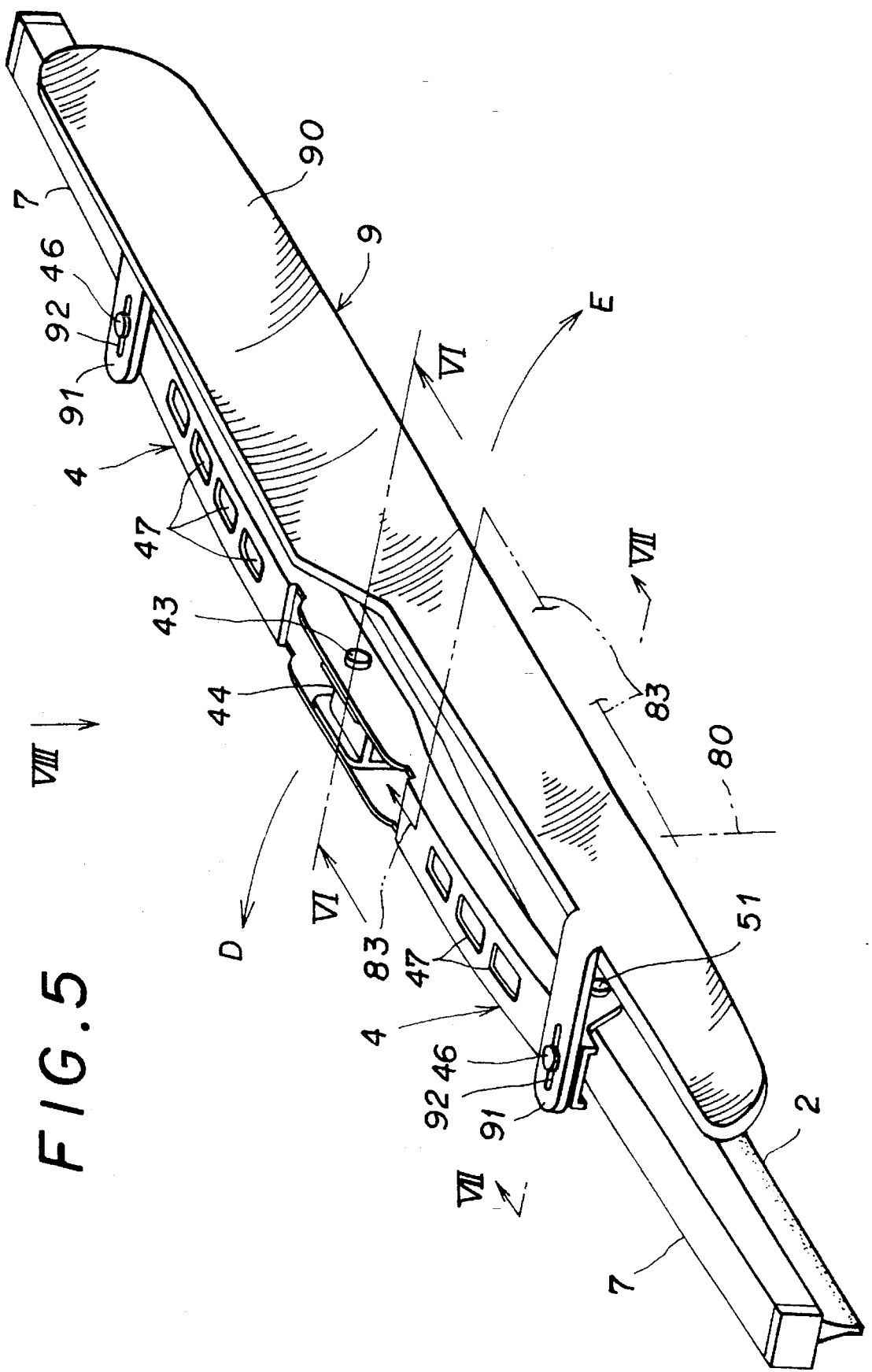

To assemble the above-mentioned elements of the wiper blade assembly, the main body 90 of the blade spoiler 9 is placed on the E-arrow side of of the primary lever 4 as shown in FIG. 5 (in a position where wiper blade is directed downward when set in its home position) in order ot lock wind and snow, and the fixtures 91 of the blade spoiler 9 are installed by the rivets 46 to the opposite ends of the primary lever 4. After that, when the blade spoiler 9 is installed to the primary lever 4 of the wiper blade, he lower edge 93 of the main body 90 of the blade spoiler 9 is positioned nearer to the windshield 1 than to the bottom of the cover 7.

The spacing G between the back of the main body 90 of the blade spoiler 9 and the wiper blade (e.g., cover 7) is adjusted to be larger than the spacing F between the lower edge 93 of the main body 90 of the blade spoiler 9 and the windshield 1.

In this wiper blade assembly according to the first embodiment of the present invention, the side plate portion of the primary lever 4 facing the blade spoiler 9 and from which the end portions and central portion are excluded is located is somewhat longer than the other side plate portion at the opposite side to the blade spoiler 9 as shown in FIGS. 9 and 10, and the longer side plate portion is tilted similarly to the main body 90 of the blade spoiler 9. The top plate portion at the middle of the primary lever 4 is cut out, and the clip 44 is placed in the cut and installed pivotably to the fight and left side plate portions of the primary lever 4 by means of the rivet 43. The secondary levers 5, yokes 6, backing plate 3 and a part (retaining portion 21 and neck portion 22) of the blade rubber 2 are covered with the cover 7 while the primary lever 4 is exposed.

The wiper blade assembly according to the first embodiment of the present invention has the blade spoiler 9 installed at a portion of the primary lever 4 of the wiper blade where wind and snow are to be blocked. When the wiper blade sweeps in the direction of arrow E while the car is running, the most of wind and snow (indicated with "H" in FIG. 6) is blocked by the main body 90 of the blade spoiler 9. Thus, the amount of wind and snow applied to the blade is reduced correspondingly since the wind and snow will not be applied directly to the wiper blade.

With the wiper blade assembly according to the first embodiment of the present invention, it is possible to reduce the direct application of snow to the wiper blade, prevent the snow from adhering to the wiper blade and thus prevent the reduction of wiping efficiency due to the snow adhesion to the wiper blade.

In the wiper blade assembly according to the first embodiment of the present invention, the lower edge 93 of the blade spoiler 9 is located nearer to the windshield 1 than to the bottom of the cover 7, so that even when a clearance 27 takes place between the top of the wiping portion 20 of the blade rubber 2 and the bottom of the cover 7, the lower edge 93 of the blade spoiler 9 will still stay nearer to the windshield 1 than to the clearance 27. So even if the wiper blade reaches a heaped snow at the lower edge of the windshield 1 when it reverses from the closing direction E to opening direction D, the snow heap will be wiped away by the lower edge 93 of the blade spoiler 9. Thus the snow can be prevented from entering directly into the clearance 27. Even if snow enters through the clearance F as indicated with the arrow I in FIG. 6, most of it will fly to the clearance between the primary lever 4 and cover 7 in the direction of arrow J and to the clearance between the main body 90 of the blade spoiler 9 and wiper blade in the direction of arrow K, so the amount of snow heaping in the clearance 27 between the top of the wiping portion 20 of the blade rubber 2 and the bottom of the cover 7 will be smaller than that in a conventional wiper blade in which snow would enter directly in the clearance 27. Therefore, with the wiper blade assembly according to the present invention, it can be avoided that the snow having entered into the clearance 27 will block the wiping portion 20 of the blade rubber 2 against reversing, resulting in a poor wiping, when the wiper blade sweeps in the direction of arrow D (in the opposite direction).

Since the wiper blade assembly according to the first embodiment of the present invention is constructed as previously mentioned, most of the wind is blocked by the main body 90 of the blade spoiler 9. The wind does not applied directly to the wiper blade and so the direct application of the wind to the wiper blade is reduced correspondingly. Thus, the wiper blade is prevented from leaving the windshield 1. Furthermore, when most of the wind H flows in the direction of arrow M along the main body 90 of the blade spoiler 9, it will press the wiper blade to or toward the windshield 1.

As mentioned in the foregoing, the secondary levers 5, yokes 6, backing channel 3 and a part (retaining portion 21 and neck portion 22) of the blade rubber 2 are covered with the cover 7 and the primary levers 4 are exposed, so that a spacing is defined between the primary lever 4 and cover 7. Also, since the plate-like fixtures 91 of the bade spoiler 9 are used to fix the blade spoiler 9 to the primary lever 4, the main body 90 of the blade spoiler 9 and the wiper blade define a spacing between them. Because of this configuration, a wind (indicated with arrow I in FIG. 6) flowing between the windshield 1 and the lower edge 93 of the blade spoiler 9 will flow to the spacing between the primary lever 4 and cover 7 in the direction of arrow J and to the spacing between the main body 90 of the blade spoiler 9 and the wiper blade in the direction of arrow K in FIG. 6. Therefore, it avoids the wind I flowing through between the windshield 1 and the lower edge 93 of the main body 90 of the blade spoil 9 from causing the wiper blade to leave the windshield 1.

Furthermore, since the spacing G between the wiper blade (cover 7) and the main body 90 of blade spoiler 9 is larger than the spacing F between the windshield 1 and the lower edge 93 of the blade spoiler 9, the above-mentioned wind (from the arrow I to arrows J and K) flows more smoothly, thereby permitting to further reduce a force which will cause the wiper blade to leave the windshield 1.

Thus with the wiper blade assembly according to the present invention, it is possible to prevent the wiper blade from leaving the windshield 1 while the car is running at a high speed.

More particularly, because the holes 92 formed in the fixtures 91 of the blade spoiler 9 are elongated ones, the position of the main body 90 of the blade spoiler 1 can be changed as shown in FIGS. 6 and 7 according to the type of the car on which the wiper blade assembly is to be used, so that there will be no interference between the main body 90 of the blade spoiler 9 and the windshield 1.

Also in the aforementioned embodiment, the side plate portion of the primary lever 4 on the side of the blade spoiler 9 is tilted generally similarly to the main body 90 of the blade spoiler 9 so that; when the side plate portion is applied with a wind when the car runs, the wind will also act to press the wiper blade to the windshield 1, thus permitting to further improve the wiping efficiency of the wiper blade.

In the first embodiment of the wiper blade assembly according to the present invention, the through-hole 47 is formed in the top plate portion of the primary lever 4. Since a wind flowing in between the primary lever 4 and cover 7 can go out through the through-hole 47, the wiper blade can be prevented from leaving the windshield 1. Thus, the wiping efficiency of the wiper blade can be further improved.

The lip portion at the end (lower) of the wiping portion 20 of the blade rubber 2 is forced to the windshield 1 by the elastic member of the wiper drive 8, and is tilted to the left in the plane of drawing as shown FIGS. 9 through 11 when the wiper blade is sweeping in the direction of arrow E or stopped. While the wiper blade is sweeping in the opening direction D, the lip portion is tilted to the right (not shown) in the plane of drawing.

FIGS. 12 through 16 show a vehicle wiper system according to the second embodiment of the present invention. In these Figures, the same or similar reference numerals as in FIGS. 1 through 11 indicate the same or similar elements as those in FIGS. 1 through 11.

In the second embodiment of the present invention, two bosses 94 protrude at one rear end (on the side of the wiper shaft 80) of the main body 90 of the blade spoiler 9. When the main body 90 of the blade spoiler 9 is held as tilted backward at the upper edge thereof and forward at the lower edge 93 thereof, the bosses 94 are protruding in a generally same direction as the wiper shaft 80. The wiper arm 83 has formed in the end portion thereof elongated holes 84 directed in the pivoting direction of thereof.

The wiper arm 83 has also formed at the end portion thereof a hook 85 which is removably engaged on the clip 44 of the wiper blade. Also a rib 95 is formed integrally with and on the back of the main body 90 of the blade spoiler 9.

Tapping screws 96 are driven into the bosses 94 of the blade spoiler 9 through the elongated holes 84 in the wiper arm 83 to fix the blade spoiler 9 to the wiper arm 83 of the wiper drive on the side of arrow E. A wiper blade is assembled to the wiper arm 83 provided with the blade spoiler 9 and the blade spoiler 9 is so positioned as to block wind and snow applied to the wiper blade.

This wiper system according to the second embodiment of the present invention can function similarly to the vehicle wiper blade assembly according to the aforementioned first embodiment of the present invention.

FIGS. 17 through 21 show the vehicle wiper blade assembly according to the third embodiment of the present invention. In these Figures, the same or similar reference numerals as in FIGS. 1 through 16 indicate the same or similar elements as those in FIGS. 1 through 16. In this embodiment, the blade rubber is supported at eight points, namely, at both ends of each of four yokes.

The reference numeral 9A indicates a holder made of, for example, a synthetic resin. The holder 9A consists of a top plate portion and right and left side plate portions, and has through-holes 90A and 91A formed in the top and right and left side plate portions, respectively, thereof.

The reference numeral 92A indicates a pop rivet as shaft member. Used as inserted from, or calked at, one side of assembled parts, the pop rivets 92A are intended to fasten a plurality of parts in a fixed relation to each other or fasten them pivotably around it with respect to each other.

A through-hole 48 is formed in the top plate portion at either end of the primary lever 4. Also a through-hole 53 is formed in the right and left side plate portions in the middle of the secondary lever 5. Further, a through-hole 73 is formed in the top plate portion of the coveting portion 72 of the cover 7.

To assemble the above-mentioned elements of the wiper blade assembly, the holder 9A is fitted on the central portion of the secondary lever 5. The through-holes 91A in the tight and left side plate portions of the holder 9A are set into alignment with the through-holes 53 in the right and left side plate portions of the secondary lever 5. As a shaft member generally in parallel with the windshield 1, the rivet 54 is inserted through the through-holes 53 and 91A and calked to pivotably fasten the holder 9A and secondary lever 5 to each other. An assembly of this holder 9A, secondary levers 5, yokes 6, backing channel 3 and blade rubber 2 is set as inserted into the cover 7. The primary lever 4 is set onto the cover 7, and the through-hole 48 in the primary lever 4, that 73 in the cover 7 and that 90 A in the top plate portion of the holder 9A are brought into alignment with each other. Then the pop rivet 92A nearly perpendicular to the windshield 1 is inserted through the through-holes 48, 73 and 90A to fix the primary lever 4, cover 7 and holder 9A. Thus, the cover 7 is laid between the primary lever 4, secondary levers 5 and yokes 6. The cover 7 covers the secondary levers 5, yokes 6, backing channel 3 and a part (retaining portion 21 and neck portion 22) of the blade rubber 2 but the primary lever 4 is exposed. Note that the rivet 54 for use to fasten the holder 9A to the secondary lever 5 and the pop rivet 92A for use to fasten the primary lever 4 to the holder 9A may be any other shaft member which would be suitable.

Figures 21, 22:
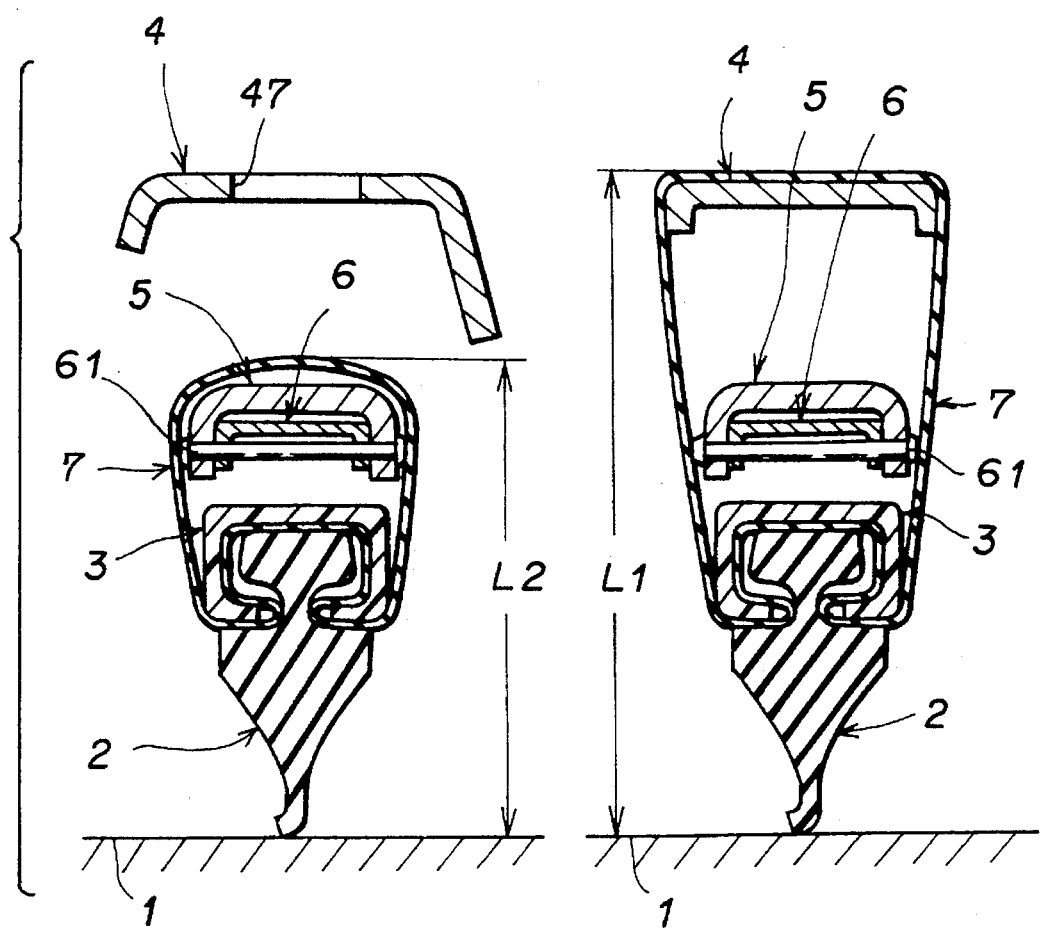
Figure 23:
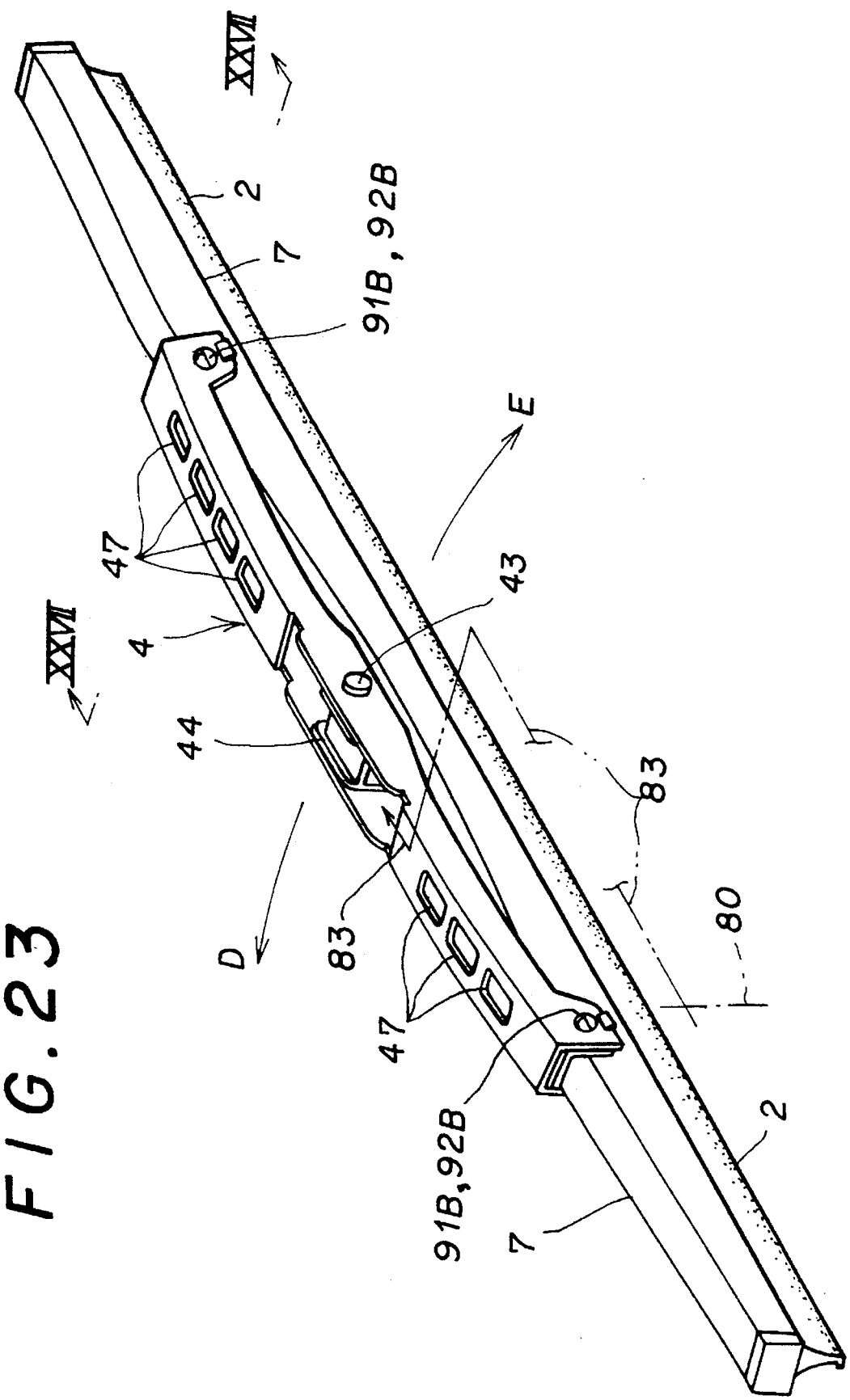
Figure 24:
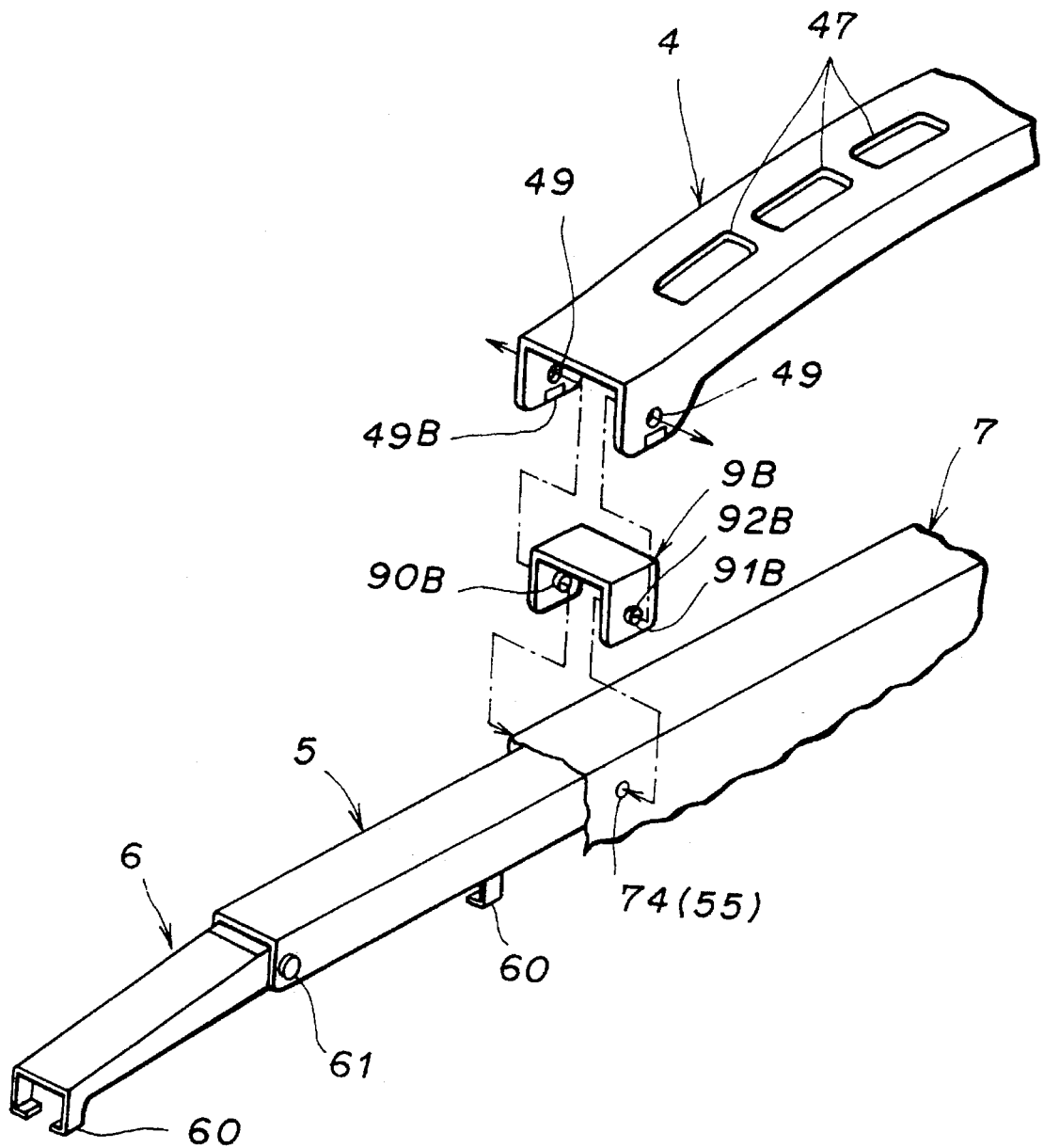
Figure 25:
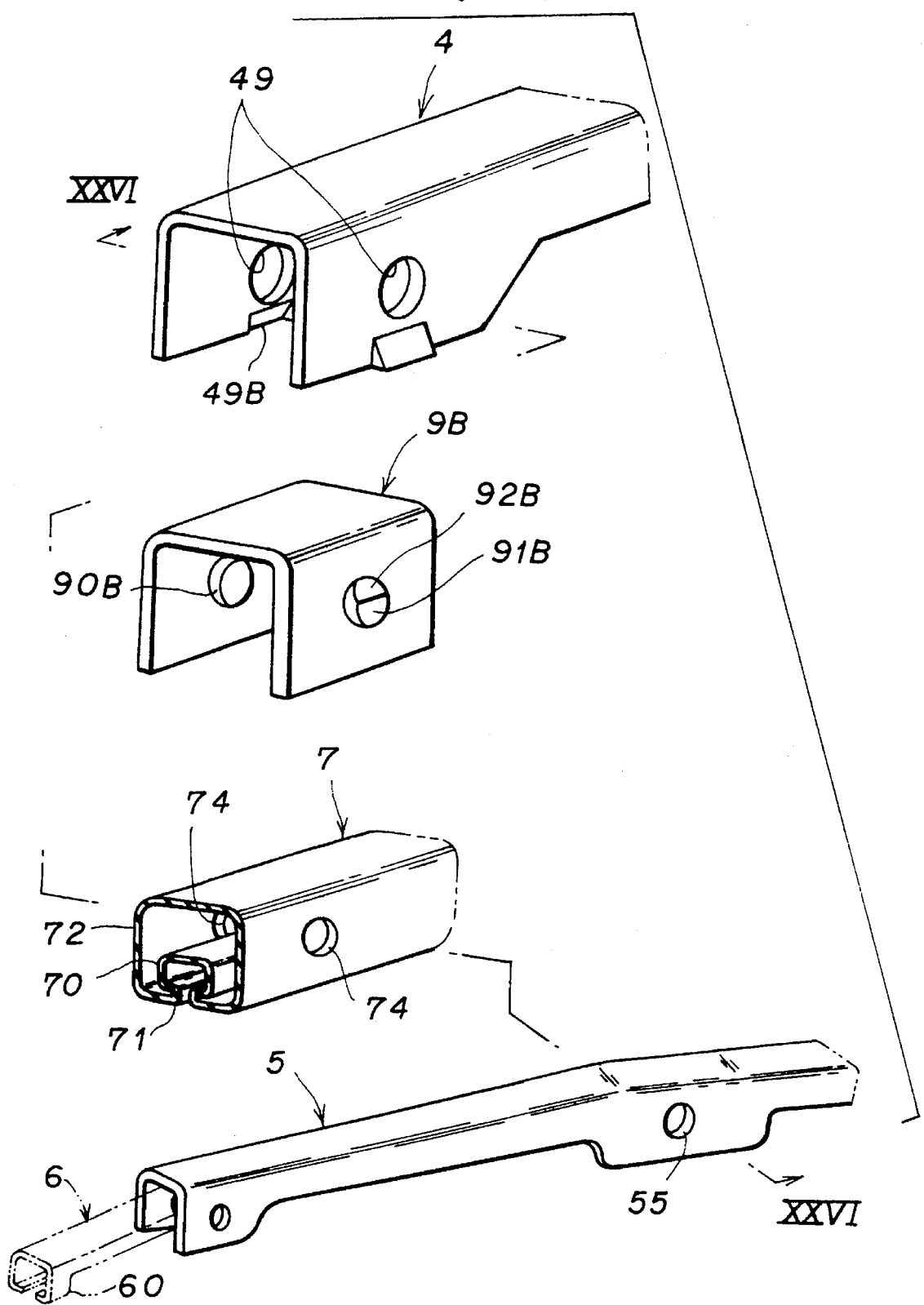
Figure 26:
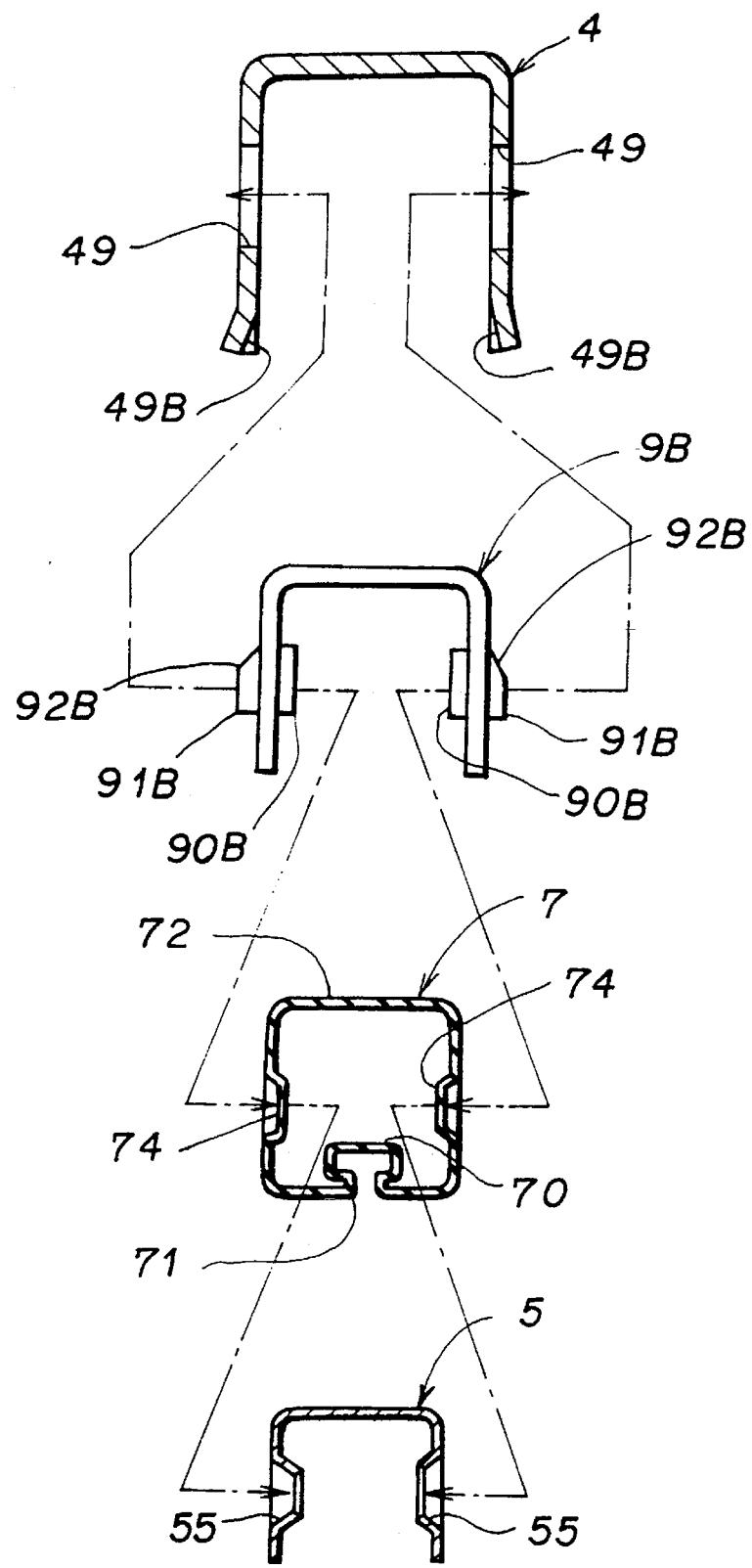
Figure 27:
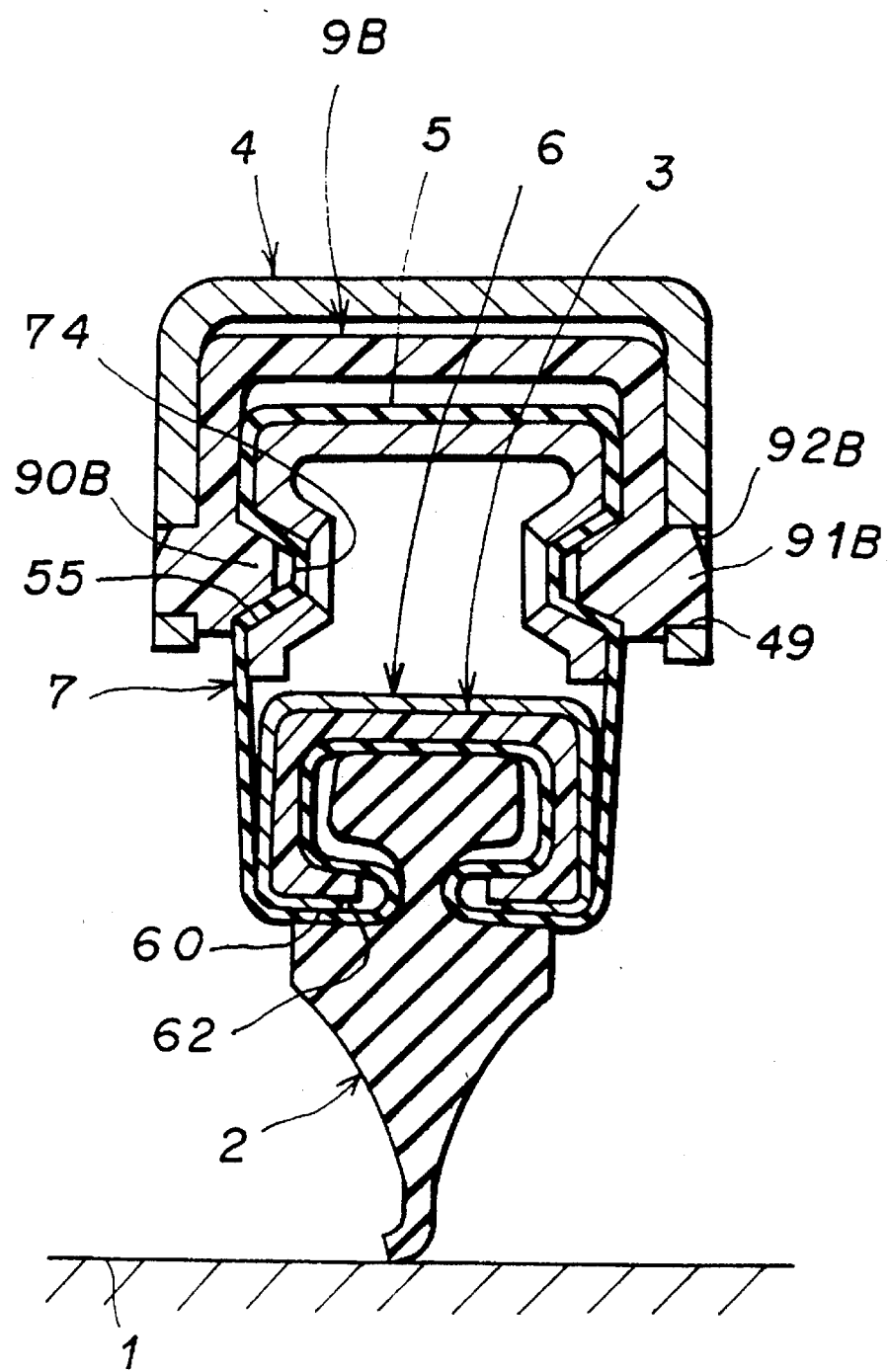
Figure 28:
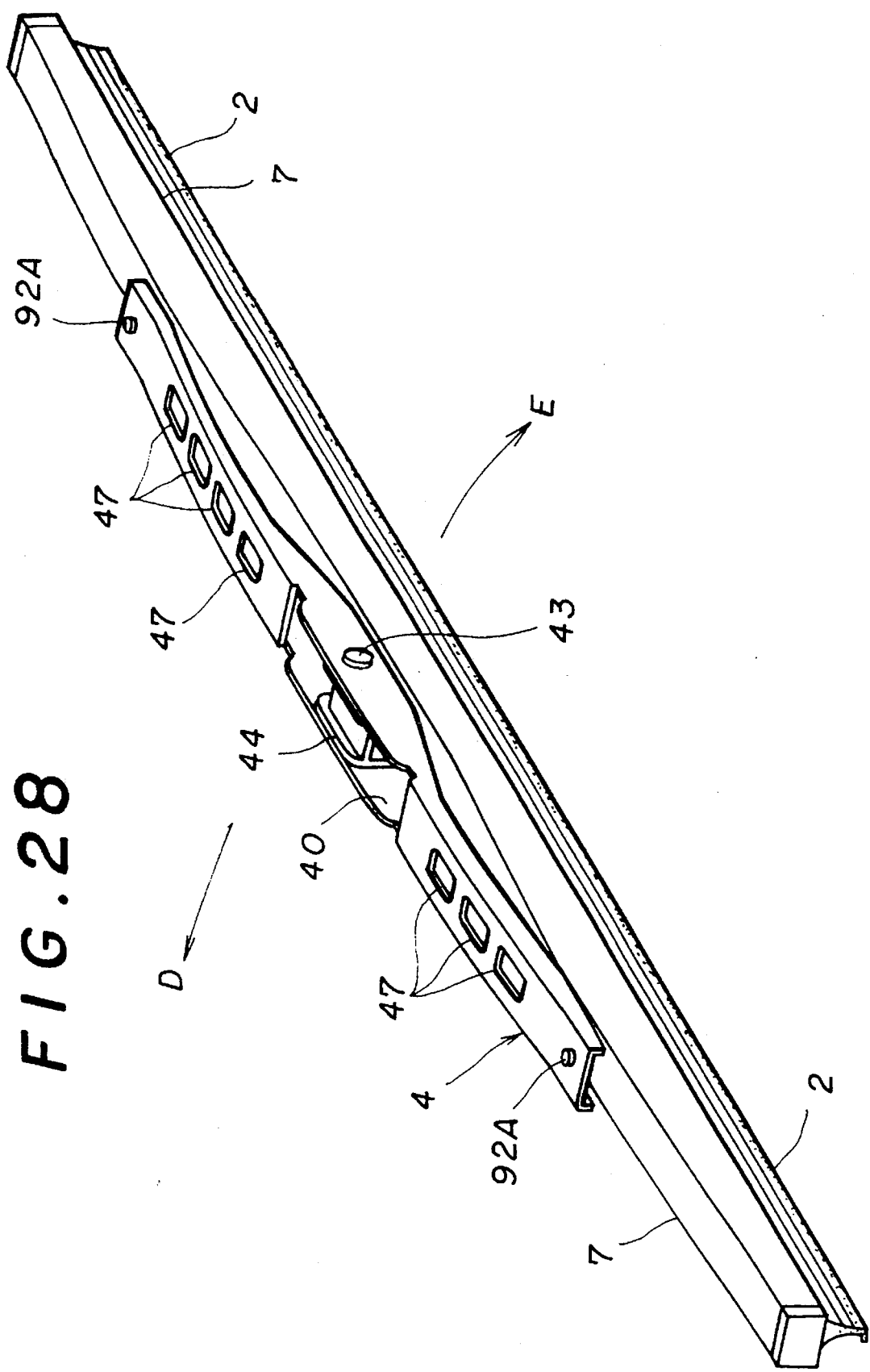
Figure 29:
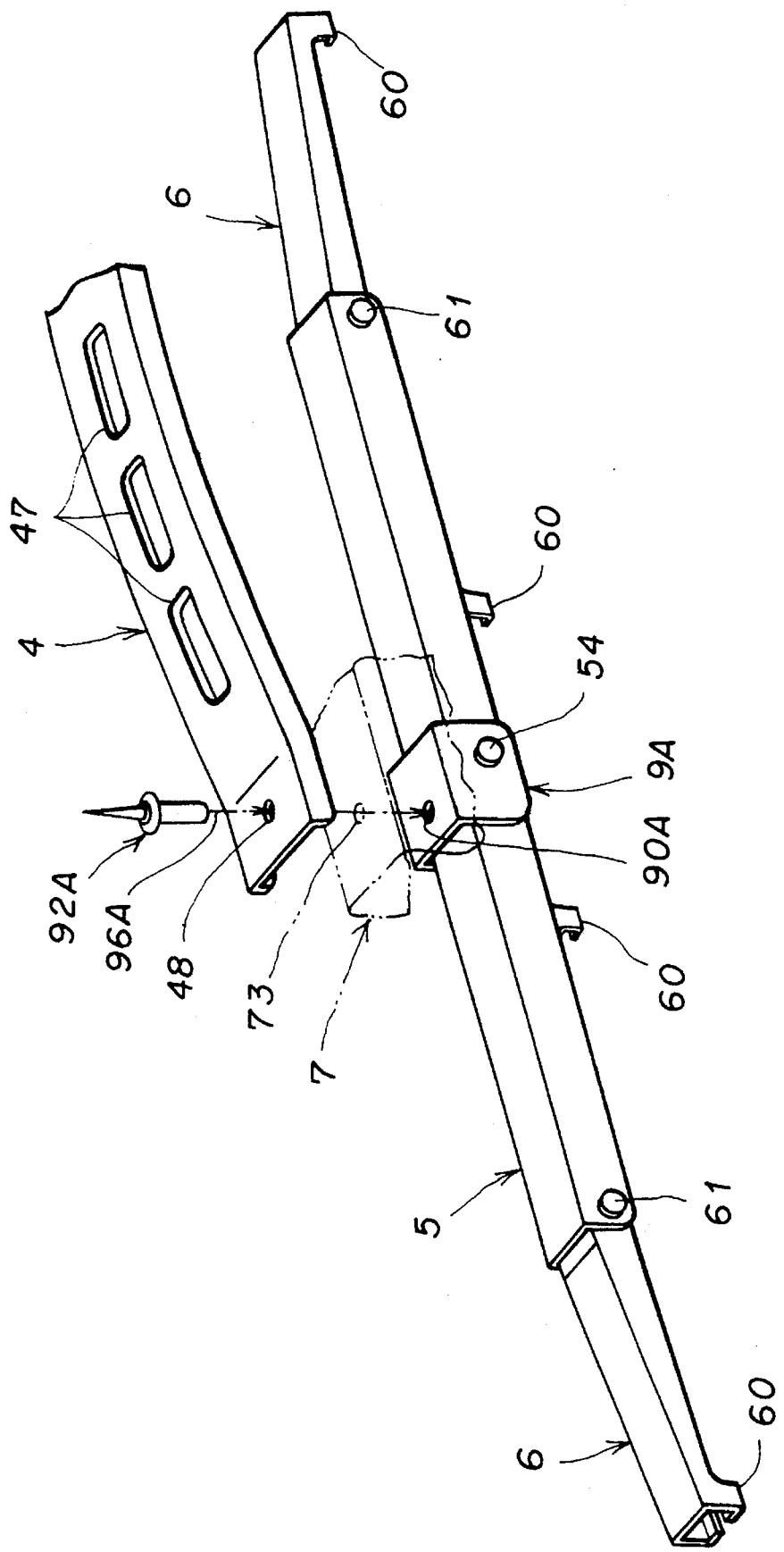
Figure 30:
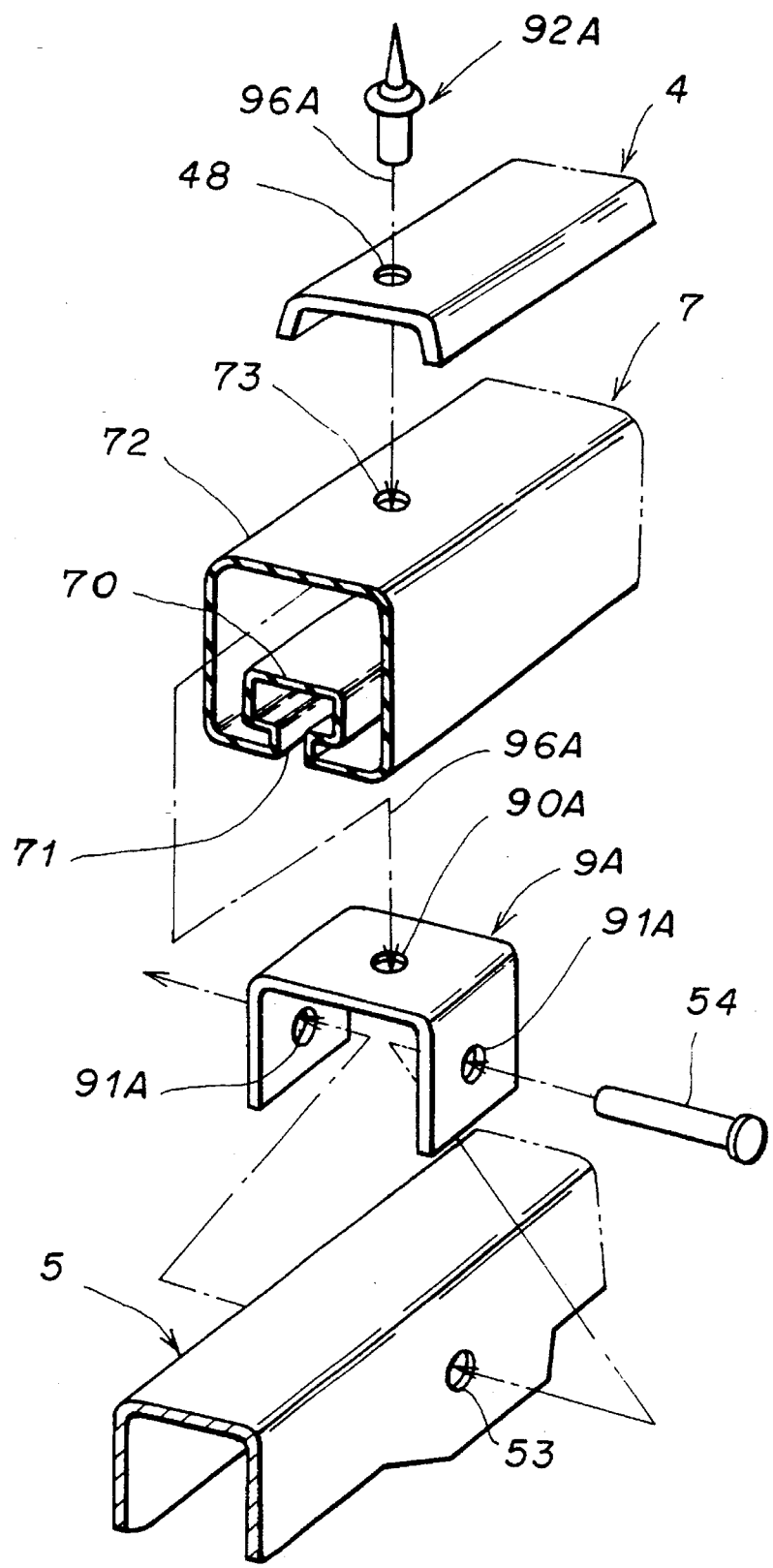
Figure 31:
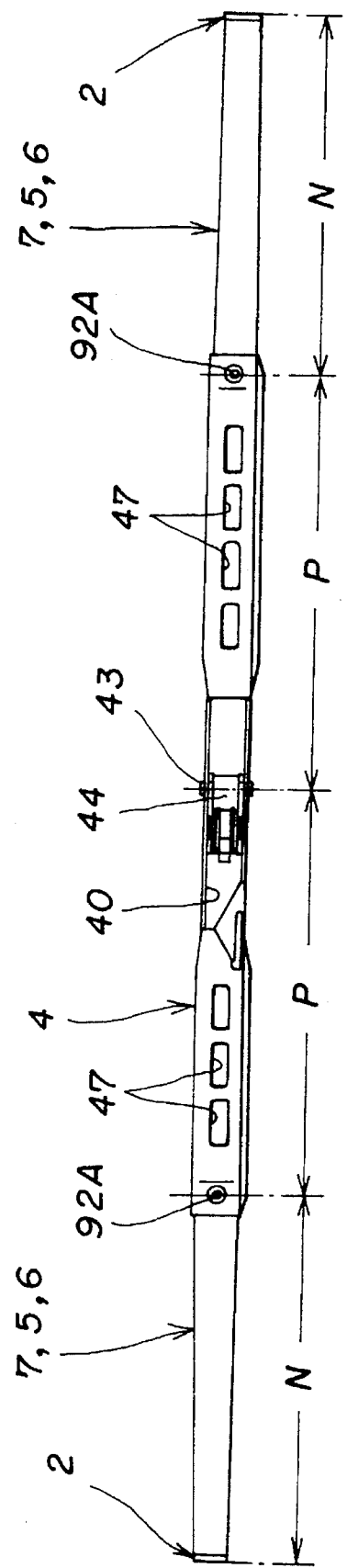
Figure 34:
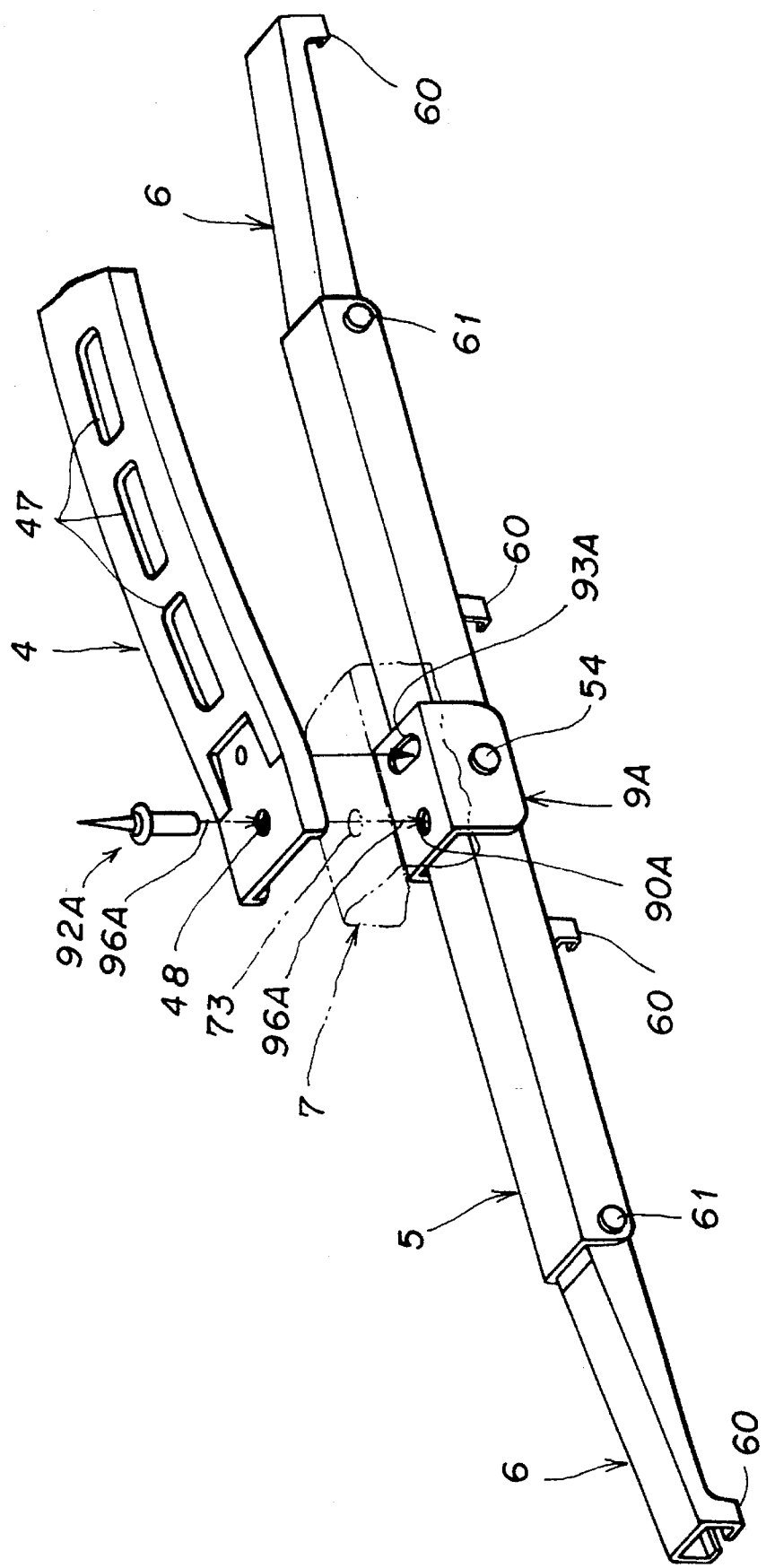
Figure 35:
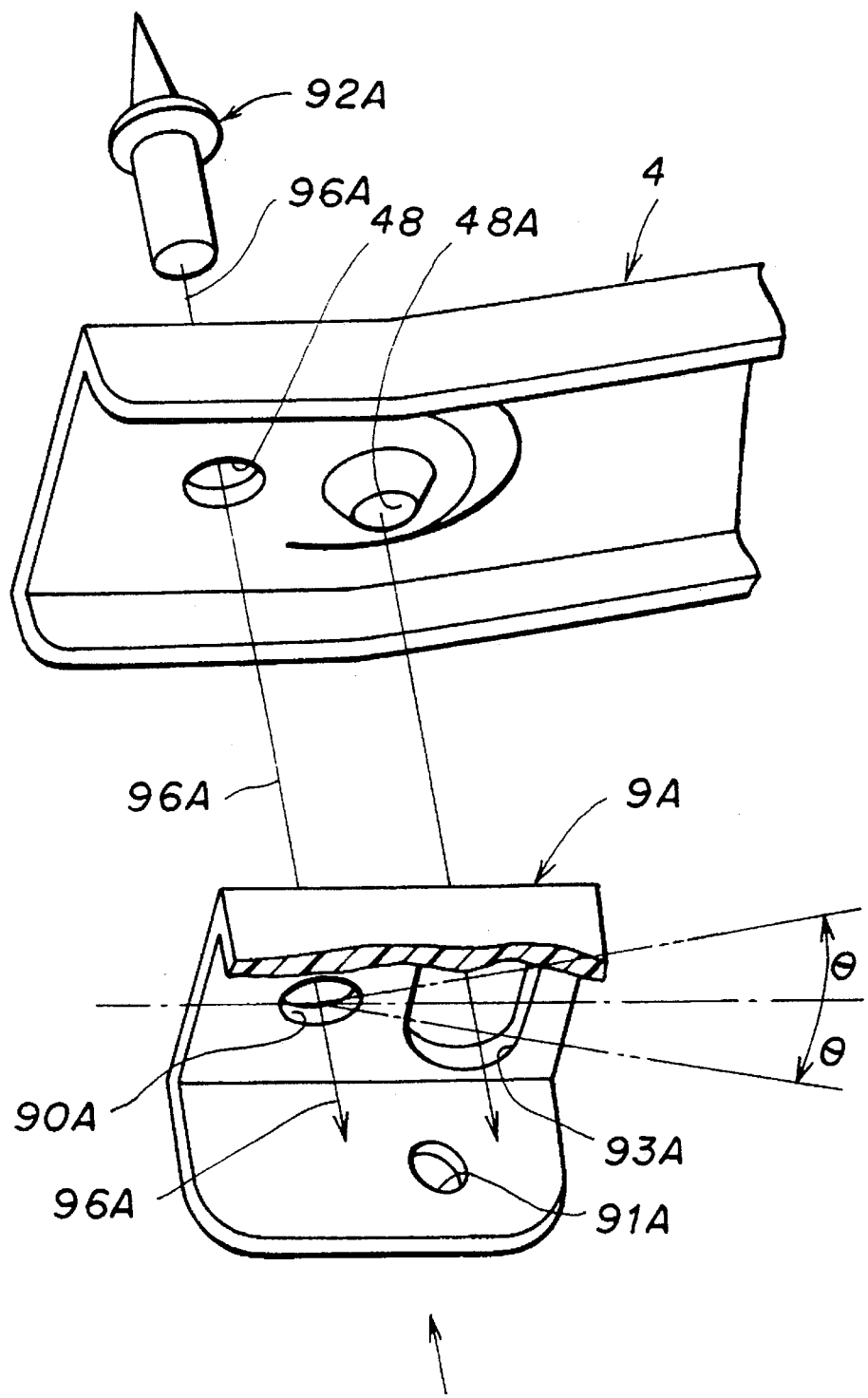
Figure 36:
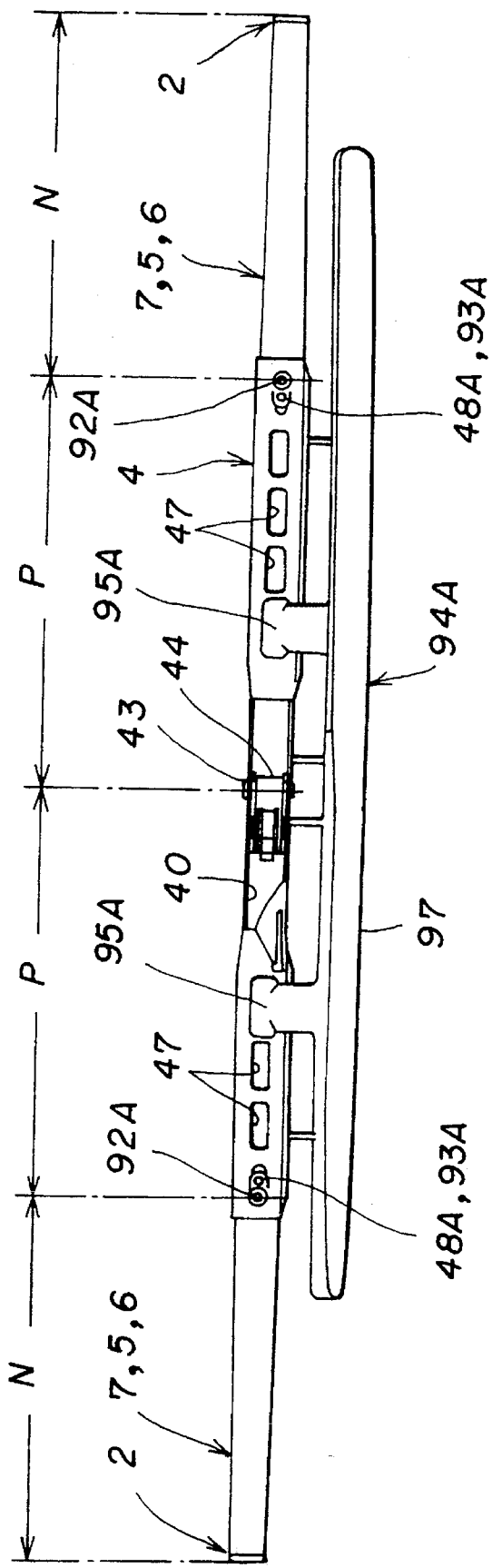

In this wiper blade assembly according to the third embodiment of the present invention, the cover 7 is laid between the primary lever 4, secondary levers 5 and yokes 6. That is, the secondary levers 5, yokes 6, backing channel 3 and a part (retaining portion 21 and neck portion 22) of the blade rubber 2 are covered with the cover 7 while the primary lever 4 is exposed. So the height L2 of the top of the cover 7 above the windshield 1 when the holder 9A to which the secondary lever 4 is fixed is covered with the cover 7 as shown in FIG. 21, is smaller than the height L1 of the stop of the cover 7 above the the windshield 1 when the primary lever 4 in a conventional ordinary wiper system is covered with the cover 7 as shown in FIG. 22. Thus, the area of the wiper blade to which the wind pressure is applied when the car is running is so small that the force with which the wiping portion 20 of the blade rubber 2 is let away from the windshield 1 is reduced. So the windshield 1 can be wiped with a constant efficiency even while the car is running at a high speed.

Since a part of the blade rubber 2, the backing channel 3, secondary levers 5, yokes 6 and holder 9A are covered with the cover 7, snow can be prevented from adhering to the wiper blade.

In this wiper blade assembly according to the third embodiment of the present invention, the cover 7 is laid between the primary lever 4 and holder 9A and the primary lever 4, cover 7 and holder 9A are fastened by calking the pop rivet 92A. So, as forced from both the primary lever 4 and holder 9A, the peripheral portion of the through-hole 73 in the cover 7 is compressed so that the inside diameter of the through-hole 73 in the cover 7 is reduced. Thus, water or snow will not easily come to inside the cover 7 through the through-hole 73 in the cover 7 (from between the inner circumference of the through-hole 73 and outer circumference of the pop rivet 92A), which provides for a waterproofing effect.

Further in this wiper blade assembly, the secondary levers 5, yokes 6, backing channel 3 and a part (retaining portion 21 and neck portion 22) of the blade rubber 2 are covered with the cover 7 and the primary lever 4 is exposed. So there is a clearance between the primary lever 4 and cover 7 and window flows to the clearance when the car is running. Therefore, the force with which the wiper blade is let away from the windshield 1 is reduced and thus the wiper blade can sweep with an improved efficiency even when the car is running at a high speed.

FIGS. 23 through 27 shows the vehicle wiper blade assembly according to the fourth embodiment according to the present invention. In these Figures, the same or similar reference numerals as in FIGS. 1 through 21 indicate the same or similar elements as those in FIGS. 1 through 21. In this embodiment, the blade rubber is supported at eight points, namely, at both ends of each of four yokes.

The reference numeral 9B indicates a holder made of, for example, a synthetic resin. The holder 9B consists of a top plate portion and right and left side plate portions. The fight and left side plate portions of the holder 9B have cylindrical engagement studs 90B formed as shaft member on the respective inner walls thereof while they have cylindrical engagement studs 91B as shaft member on the respective outer walls thereof. The upper half portion 92B of the engagement stud 91B is cut obliquely.

The primary lever 4 has a through-hole 49 formed in each of the right and left side plate portions at opposite ends thereof and also a slant portion 49B formed on an inner wall, below the through-hole 49, of the right and left side plate portions at the opposite ends thereof. Also the secondary lever 5 has a through-hole 55 formed in the central portion of each of the right and left side plate portions thereof. The through-hole 55 is the bottom opening in a countersunk portion of the side plate portion. In addition, The cover 7 has an engagement convexity/concavity 74 formed on each of the right and left side walls of the covering portion 72 thereof. The engagement convexity/concavity 74 is convex when viewed from inside while it is concave when viewed from outside.

To assemble the above-mentioned elements of the wiper blade assembly, the assembly of the secondary levers 5, yokes 6, backing channel 3 and blade rubber 2 is set as inserted into the cover 7. The engagement convexity 74 on the inner wall of the cover 7 is engaged into the through-hole 55 in the secondary lever 5. Then, the insertion stud 90B on the inner wall of the holder 9B is engaged into the engagement concavity 74 of the cover 7 and through-hole 55 in the secondary lever 5. The holder 9B is so installed to the secondary lever 5 with the cover 7 laid between them by means of the cover 7 as to be pivotable about a shaft generally parallel to the windshield 1. After that, the engagement stud 91B on the outer wall of the holder 9B is fitted into the through-hole 49 on the primary lever 4. The primary lever 4 is fastened to the holder 9B pivotably about a shaft generally parallel to the windshield 1 so that the cover 7 is laid between the primary lever 4, holder 9B, secondary levers 5 and yokes 6. That is, the secondary levers 5, yokes 6, backing channel 3 and a part (retaining portion 21 and neck portion 22) of the blade rubber 2 are covered with the cover 7 while the primary lever 4 and holder 9B are exposed. The above-mentioned insertion studs 90B and engagement studs 91B may be any other shaft member which would be suitable.

In the wiper blade assembly according to the fourth embodiment of the present invention, the secondary levers 5 and so forth are covered with the cover 7. The holder 9B is attached to the cover 7 and the primary lever 4 is attached to the holder 9B. In the third embodiment, the holder 9A is attached to the secondary levers 5, etc. and the secondary levers 5, etc. and holder 9A are covered with the cover 7 which is laid between the holder 9A and primary lever 4. Therefore, the fourth embodiment has a same effect as the third embodiment.

More particularly, since no hole is formed in the cover 7 in this embodiment, it is possible to positively prevent snow from coming to inside the cover 7.

FIGS. 28 through 33C show the vehicle wiper blade assembly according to the fifth embodiment of the present invention. In these Figures, the same or similar reference numerals as in FIGS. 1 through 21 indicate the same or similar elements as those in FIGS. 1 through 21. In this embodiment, the blade rubber is supported at eight points, namely, at both ends of four yokes.

The fifth embodiment has a generally same structure as the aforementioned third embodiment. Specifically, a pop rivet 92A nearly perpendicular to the windshield 1 is passed through the holes formed in either end of the primary lever 4, cover 7 and holder 9A, respectively to fasten the central portion of the secondary lever 5 pivotably about a shaft 96A of the pop rivet 92A generally perpendicular to the windshield 1.

Assuming that the distance from the pivot for the primary and secondary levers 4 and 5, namely, the pop rivet 92A, to the plate rubber 2 is N and the distance from the pivot for the primary and secondary levers 4 and 5, namely, the pivot 92A, to the fixation between the primary lever 4 and wiper drive 8 is P, the distance N is smaller than P.

The wiper blade assembly according to this embodiment functions as will be discussed below:

First, the wiper motor of the wiper drive 8 is put into operation. The wiper blade will sweep reciprocally at a high speed, at a low speed or intermittently in the direction of arrow D fin the opening direction) and in the direction of arrow E (in the closing direction) as in FIG. 28 to wipe the windshield 1 with the wiping portion 20 of the blade rubber 2. At this time, the central portion of the blade rubber 2 is strongly forced to the windshield 1 under the pressure of the wiper arm 83 of the wiper drive 8. So, the friction between the windshield 1 and the wiping portion 20 of the blade rubber 2 is great. However, the pressure of the wiper arm 83 of the wiper drive 8 is weaker from the central portion to both the end portions thereof. So the friction between both end portions of the blade rubber 2 and the windshield 1 is smaller. Therefore, the secondary levers 5 at both ends of the primary lever 4 are pivoted about the shaft 96A of the pop rivet 92A generally perpendicular to the windshield 1 in the horizontal direction of the windshield 1. More particularly, the end portions of the secondary levers 5 are pivoted in the directions D and E of the wiper blade (opening direction in FIG. 32A and closing direction in FIG. 33A) and in the same directions Q and R, respectively, as shown in FIGS. 32A and 33A. As shown in FIGS. 32B and 33B, the blade rubber 2 is so curved that the opposite ends thereof move before the central portion in the wiping directions D and E as viewed from a direction perpendicular to the windshield 1. So the blade rubber 2 according to the present invention is easy to tilt with respect to the windshield 1 as shown in FIGS. 32C and 33C and can smoothly follow the windshield 1 having a relatively small radius of curvature. Thus the blade rubber 2 can wipe the windshield 1 positively.

Especially in this embodiment, the pop rivet 92A serving as a hinge and having a shaft nearly perpendicular to the windshield 1 is used to fasten the secondary lever 5 to either end of the primary lever 4 pivotably about the shaft 96A generally perpendicular to the windshield 1. Therefore, the friction between the windshield 1 and blade rubber 2 when the wiper is in operation will cause the secondary lever 5 at either end of the primary lever 4 to pivot smoothly with respect to the primary lever 4 in the horizontal direction of the windshield 1 about the shaft 96A of the pop rivet 92A nearly perpendicular to the windshield 1. So the blade rubber 2 can be curved further smoothly due to the smooth pivoting of the secondary levers 5. The means of fastening the secondary levers 5 to the primary lever 4 may be other than the pop rivet 92A.

In this embodiment, the distance N from the pivot (pop rivet 92A) for the primary and secondary levers 4 and 5 to the end of the blade rubber 2 is smaller than the distance P from the pivot (pop rivet 92A) for the primary and secondary levers 4 and 5 to the fixation (rivet 43 for fixing the clip 44) between the primary lever 4 and wiper drive 8, so that the friction between the windshield 1 and the central portion of the blade rubber 2 is larger while that between the windshield 1 and opposite ends of the blade rubber 2 is smaller. Thus the secondary lever 5 at either end of the primary lever 4 pivots further smoothly and the blade rubber 2 is curved further smoothly. It should be noted that the present invention is not limited only to the above-mentioned geometry. Depending upon the force under which the blade rubber 2 is pressed to the windshield 1, the distance N may be equal to P or N may be larger than P.

In this embodiment, the primary lever 4, cover 7 and holder 9A are fastened together by the pop rivet 92A with the cover 7 laid between the primary lever 4 and holder 9A. Since the peripheral portion of the through-hole 73 in the cover 7 is compressed with the pressure from both the primary lever 4 and holder 9A, the through-hole 73 in the cover 7 is reduced in inside diameter so that water or snow is prevented from coming to inside the cover 7 through the through-hole 73 in the cover 7 (namely, through between the internal circumference of the through-hole 73 and that of the pop rivet 92A), which provides for a water-proofing effect. When the primary lever 7 and holder 9A are pivoted reversely in relation to each other, shearing stresses in opposite directions take place at the side of the cover 7 in contact with the primary lever 4 and at the side of the cover 7 in contact with the holder 9A, respectively. However, the elasticity of the cover 7 causes both the sides of the cover 7 to be deformed in opposite directions by a shearing due to elastic deformation. Thus, the primary lever 4 and holder 9A can be pivoted in opposite directions. So the blade rubber 2 can be curved smoothly as mentioned above.

FIGS. 34 through 38C show the vehicle wiper blade assembly according to the sixth embodiment of the present invention. In these Figures, the same or similar reference numerals as in FIGS. 1 through 21 and FIGS. 23 through 33C indicate the same or similar elements as those in FIGS. 1 through 21. In this embodiment, the blade rubber is supported at eight points, namely, at both ends of four yokes.

This sixth embodiment is a variant of the firth embodiment.

The reference numeral 48A indicates an engagement convexity formed on the top plate portion at either end of the primary lever 4 and in the proximity of the through-hole 48. The engagement convexity 48A has the form of a circular truncated cone.

The reference numeral 93A indicates an engagement hole formed in the top plate portion of the holder 9A and in the proximity of the through-hole 90A. The centera line of the hole 93A is a part of a circle formed about the center of the through-hole 90A.

The engagement convexity 48A is engaged in the engagement hole 93A with the cover 7 laid between them. The engagement convexity 48A and hole 93A serve to limit the pivoting angle (for example, 2θ) of the coupling members (secondary lever 5 and yoke 6) for the primary lever 4. In this embodiment, the engagement convexity 48A is engaged in the hole 93A with the cover 7 laid between them. However, a through-hole may formed in the cover 7 to engage the engagement convexity 48A directly into the engagement hole 93A.

The reference numeral 94A indicates a blade spoiler consisting of a main body 97A and fixtures 95A formed integrally with and projected from the main body 97A. The fixtures 95A of the blade spoiler 94A are fixed as fitted in the through-holes 47 in the primary lever 4 and the blade spoiler 95A is fastened to the primary lever 4. The blade spoiler 94A is applied at the main body 97A thereof with a wind pressure when the car is running and effectively presses the wiper blade to the windshield 1.

Because of the above-mentioned construction of the sixth embodiment, the wiper blade assembly according to this embodiment has a same effect as the aforementioned fifth embodiment.

Figure 38A:
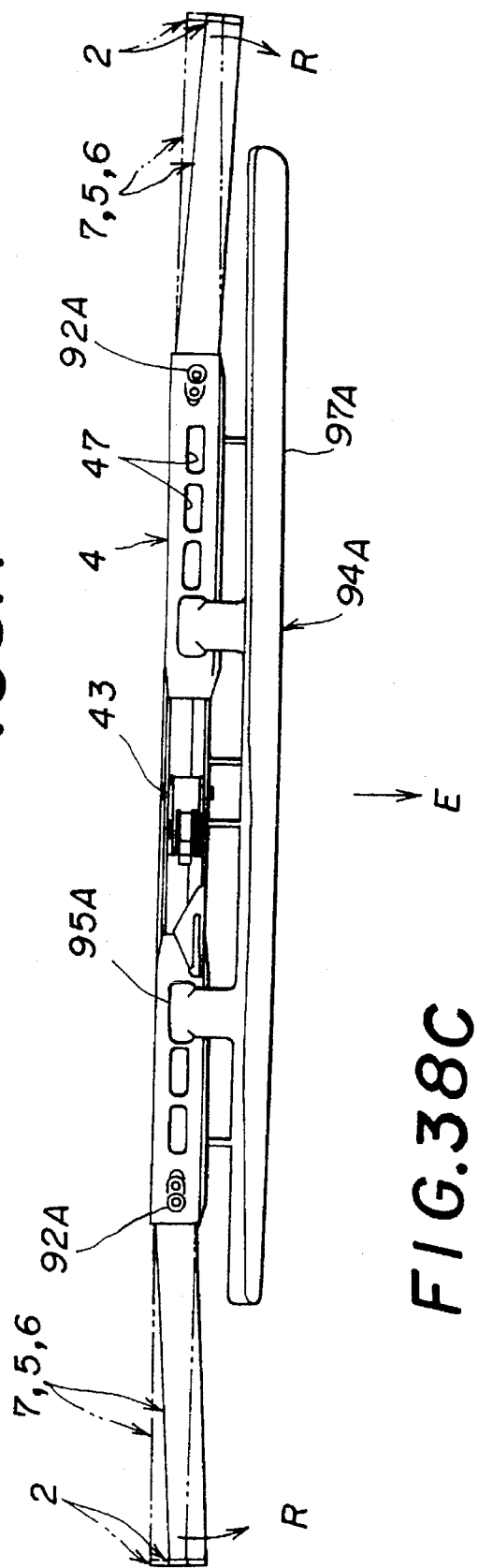
FIG. 38A is a plan view of the wiper blade being sweeping in the closing direction.
Figure 38B:
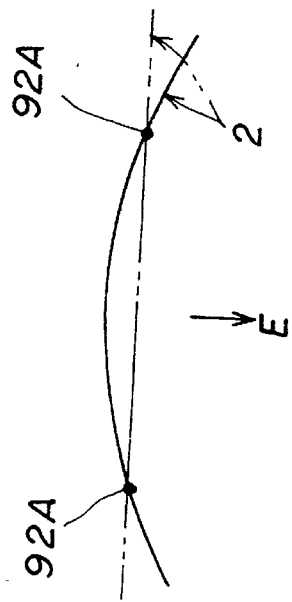
FIG. 38B is an explanatory drawing of the wiper blade being sweeping in the closing direction (the blade rubber being curved)
Figure 38C:
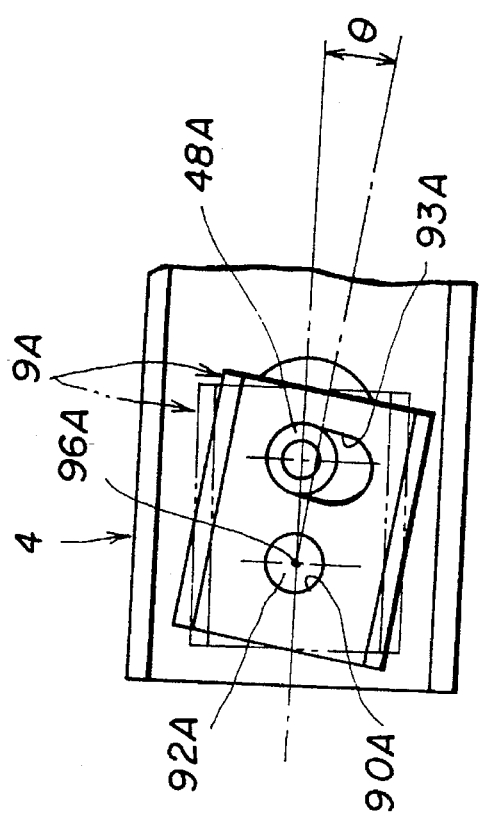

Especially in this embodiment, the pivoting angle of the support members (secondary lever 5 and yoke 6) for the primary lever 4 can be limited. More particularly, when the secondary lever 5 is pivoted through an angle θ in the direction Q or R in relation to the primary lever 4 moving in the direction D or E when the wiper blade assembly is sweeping as shown in FIG. 37A or 38A, the engagement convexity 48A of the primary lever 4 abuts one or the other edge of the engagement hole 93A in the holder 9A fixed to the secondary lever 5, as shown in FIG. 37A or 38A, to limit the pivoting angle of the secondary lever 5.

Thus, the extent of the curvature of the blade rubber 2 can be adjusted to match various factors including the curvature of the windshield 1, distance (2P) between the pivoting shafts (pop rivets 92A) of the secondary levers 5 at both ends of the primary lever 4, wind pressure, etc. At the time of wiping, the blade rubber 2 can be curved according to the curvature of the windshield 1 having curves of relatively small radii of curvature, thus it can wipe the windshield 1 very positively.

In this sixth embodiment, the extent of the curvature of the blade rubber 2 can be limited, so that even if the blade spoiler 94A is provided on the wiper arm 83 or the wiper blade, the above-mentioned curved blade rubber 2 can be prevented from interfering with the blade spoiler 94A.

In the foregoing, the present invention (defined as in claim 9) has been described concerning the wiper blade assembly using the cover 7 as in the fifth and sixth embodiments. However, the present invention can be applied to a wiper blade assembly using no such cover 7 as well.

The first through sixth embodiments having been described in the foregoing relate to wiper blade assemblies and wiper systems intended for use to wipe the automobile windshield. However, the present invention can also be applied to any other wiper blade assemblies and wiper systems.

What is claimed is:

1. A vehicle wiper blade assembly comprising:

an elongated wiper blade adapted for wiping a windshield;

at least one support member supporting the wiper blade at different points along the length thereof;

at least one holder pivotally connected to the support member;

a cover covering the support member, the holder, and a portion of the wiper blade;

an elongated primary lever pivotally connected to the holder with the cover situated therebetween, wherein the holder is pivotal on said support member about a first axis substantially transverse to the primary lever and the primary lever is pivotal on said holder about a second axis substantially perpendicular to the first axis;

a blade spoiler connected to the primary lever and adapted to apply pressure to the wiper blade against the windshield when the vehicle is moving.

2. A vehicle wiper blade assembly according to claim 1, wherein the spoiler is spaced from the wiper blade and has a lower edge adapted to be nearer to the windshield than a bottom of the cover.

3. A vehicle wiper blade assembly according to claim 1, wherein the blade spoiler is adjustably connected to the primary lever to enable adjustment of the spacing between the wiper blade and the spoiler.

4. A vehicle wiper blade assembly according to claim 1, further comprising a shaft member connecting the holder to the support member and a pop rivet connecting the primary lever to the holder, wherein the shaft member is positioned substantially perpendicularly to the pop rivet.

5. A vehicle wiper blade assembly comprising:

an elongated wiper blade adapted for wiping a windshield;

at least one support member supporting the wiper blade at different points along the length thereof;

at least one holder pivotally connected to the support member;

a cover covering the support member, the holder, and a portion of the wiper blade;

an elongated primary lever pivotally connected to the holder with the cover situated therebetween, wherein the holder is pivotal on said support member about a first axis substantially transverse to the primary lever and the primary lever is pivotal on said holder about a second axis substantially perpendicular to the first axis;

a wiper arm removably connected to the primary lever;

a blade spoiler connected to the wiper arm and adapted to apply pressure to the wiper blade against the windshield when the vehicle is moving, wherein the spoiler is spaced from the wiper blade and has a lower edge adapted to be nearer to the windshield than a bottom of the cover.

6. A vehicle wiper blade assembly according to claim 5, wherein the spoiler is spaced from the wiper blade and has a lower edge adapted to be nearer to the windshield than a bottom of the cover.

7. A vehicle wiper blade assembly according to claim 5, wherein the blade spoiler is adjustably connected to the primary lever to enable adjustment of the spacing between the wiper blade and the spoiler.

8. A vehicle wiper blade assembly according to claim 5, further comprising a shaft member connecting the holder to the support member and a pop rivet connecting the primary lever to the holder, wherein the shaft member is positioned substantially perpendicularly to the pop rivet.

* * * * *